United States Patent [19]

Mori et al.

[11] 4,277,670
[45] Jul. 7, 1981

[54] TEMPERATURE CONTROL SYSTEM FOR ELECTRIC HEATING APPARATUS

[75] Inventors: Shun'ichiro Mori, Koriyama; Kunio Kimata, Kyoto; Hirofumi Aoygi, Habikino; Hiroshi Horii, Kashihara; Hidenobu Hasegawa, Kusatsu, all of Japan

[73] Assignee: Matsushita Electric Industrial Co., Ltd., Osaka, Japan

[21] Appl. No.: 31,072

[22] Filed: Apr. 18, 1979

[30] Foreign Application Priority Data

Apr. 20, 1978 [JP] Japan ................................. 53-47312

[51] Int. Cl.³ ............................................ H05B 1/02
[52] U.S. Cl. ................................... 219/492; 219/494; 219/212; 219/491; 219/511
[58] Field of Search ............... 219/490, 212, 494, 522, 219/492, 510, 497, 511, 499, 501, 508, 528; 323/22 SC, 18; 307/117

[56] References Cited

U.S. PATENT DOCUMENTS

| 3,543,005 | 11/1970 | Kelemen | 219/494 |
|---|---|---|---|
| 3,666,921 | 5/1972 | Shevlin | 219/492 |
| 3,784,843 | 1/1974 | Gustus | 219/501 |
| 3,808,402 | 4/1974 | Rea | 219/483 |
| 3,813,516 | 5/1974 | Kudsi et al. | 219/494 |
| 3,819,904 | 6/1974 | Novak | 219/492 |
| 3,858,141 | 12/1974 | Lackey | 219/492 |
| 4,138,607 | 2/1979 | Engelmen | 219/497 |

Primary Examiner—Arthur T. Grimley
Assistant Examiner—M. H. Paschall
Attorney, Agent, or Firm—Whittemore, Hulbert & Belknap

[57] ABSTRACT

A system comprising a heat generating load, a power control element for controlling power supply to the heat generating load, a temperature detecting circuit for producing an ON signal when the temperature of the load detected by a temperature sensor is lower than a set temperature and an OFF signal when the temperature has reached the set temperature, and a control circuit for feeding on ON or OFF signal to the power control element in response to the signal from the temperature detecting circuit. The control circuit includes a hysteresis control circuit which, once the temperature detecting circuit detects that the temperature has reached the set temperature, permits the power control element to receive OFF signals for a suitable period of time even after the temperature has subsequently lowered to a level at which the signal from the temperature detecting circuit changes to an ON signal. Under the electronic temperature control, the temperature of the article to be heated swings over a predetermined range, giving stimulating and comfortable warmth to the human body.

9 Claims, 41 Drawing Figures

TEMPERATURE CONTROL SYSTEM FOR ELECTRIC HEATING APPARATUS

The present invention relates to a temperature control system for electric blankets, electric bed sheets, electric floors, electric carpets and the like. The system has the following advantages over conventional systems.

(1) It is an electronic temperature control system operable with high accuracy and high reliability.

(2) The system is adapted for temperature hysteresis, permitting the temperature of the article, such as a blanket, to be heated to vary over a predetermined range, to give stimulating and comfortable warmth to the human body unlike conventional systems.

Since conventional electronic temperature control systems control the temperature of the article to be heated to a constant level under proportional control, they have the drawback of affording excessive or insufficient heat during seasons such as spring and fall in which the room temperature is at a relatively high level, unless the temperature of the article is finely adjusted in accordance with the body temperature to keep the two temperatures in balance with each other.

In view of the above drawback, the present invention contemplates temperature hysteresis to render the temperature of the article swingable over a predetermined range so that the temperature of the article can be periodically set to a level sufficiently higher than the body temperature even if the temperature of the article is low on the average. This assures that stimulating warmth will be given to the human body.

(3) Aside from the usual temperature setting, the system is manually or automatically settable at a high temperature to operate at the high level for a specified period of time and is thereafter brought out of the high setting operation into operation at the usual setting.

When the temperature setting knob is set to a high temperature with the conventional electronic temperature control system, the system maintains temperature control at the high temperature. If it is desired to operate the system at the high setting only for a certain period of time and thereafter at a usual setting lower than the high level, the user must return the knob to the usual setting. For instance, when an electric blanket incorporating the usual temperature control system is used in such a manner that the blanket is preheated at the high setting only for a given period of time before sleeping for heat accumulation, the temperature setting knob must be returned from the high setting to the usual setting by the user at a suitable time when preheating or heat accumulation has been completed. The blanket is therefore inconvenient to use, involves energy losses unless the knob is returned to the usual setting and is likely to cause a low-temperature burn on the human body when heating the body at the high setting for a prolonged period of time.

In contrast, the system of this invention operates at the high setting for a specified period of time only and thereafter automatically resumes operation at the usual setting. This renders the electric device usable with ease and ensures savings in energy and improved safety.

(4) Another feature contemplated by the present invention is to effect proportional temperature control or hysteresis temperature control selectively with the use of a knob or the like as desired by the user at the desired time and also to render the temperature swingable through an adjustable range.

(5) After the temperature of the article has reached the set level, the power supply to the heater or like heat generating load is stopped, thereafter allowing the temperature of the article to drop by a predetermined differential range, whereupon a timer is actuated. Upon the lapse of time set by the timer, the timer produces output, which starts the power supply to the heat generating load. When the article has good heat retaining properties against heat dissipation, the temperature of the article falls slowly, with the result that the time taken for the temperature to drop through the specified differential range is relatively longer than the time set on the timer. Thus the temperature of the article is swingable substantially over the differential range. Conversely if the article has low heat retaining properties, the temperature of the article falls rapidly through the differential range in a greatly shortened time. Consequently the temperature swings over a range determined only by the time set on the timer.

In contrast, the hysteresis control system in which the heat generating load is energized or deenergized to maintain the temperature only over the specified (differential) temperature range involves frequent switching action of the power control element under some conditions. This adversely affects the life of contacts and leads to power supply troubles.

The present invention has overcome these problems and provides an appropriate temperature swing even under varying conditions in which the article may be used.

(6) The temperature swing for hysteresis control is variable by altering the differential temperature range for the article or the time set by the timer. This enables the system to meet varying needs.

(7) The system incorporates a high setting holding circuit provided with a knob other than the usual temperature setting knob. The knob sets the system to the high temperature when pulled and resets and returns the system to the usual setting when pressed on. The circuit holds the system in high setting operation for a specified period of time when the knob is pulled. For high setting operation, the blanket is usually set to a temperature of about 50° C. which could cause a low-temperature burn on the human body. Since the system is settable to the high temperature operation by pulling the knob and can be brought out of this operation when the knob is pressed on, the high setting operation can be invariably discontinued when the knob is pushed inadvertently during sleeping. This leads to exceedingly higher safety than when the knob is adapted to effect high setting operation upon depression.

(8) When the switch for setting the system for high temperature operation is made automatically operable as by detecting the atmospheric temperature (room temperature), the system can be maintained in high setting operation in a low-temperature environment.

(9) The system can be brought out of the high setting operation manually, or automatically with output produced a specified period of time after preheating by opening the switch contact with a coil or the like energized with the output. Thus the system is adapted for various uses.

(10) The hysteresis temperature control or proportional temperature control is alternatively selectable as desired by the user, while the high setting operation can be maintained for a specified period of time. The system therefore meets various needs of the user.

Preferred embodiments of the invention will be described below with reference to the accompanying drawings, in which.

Figure 1:
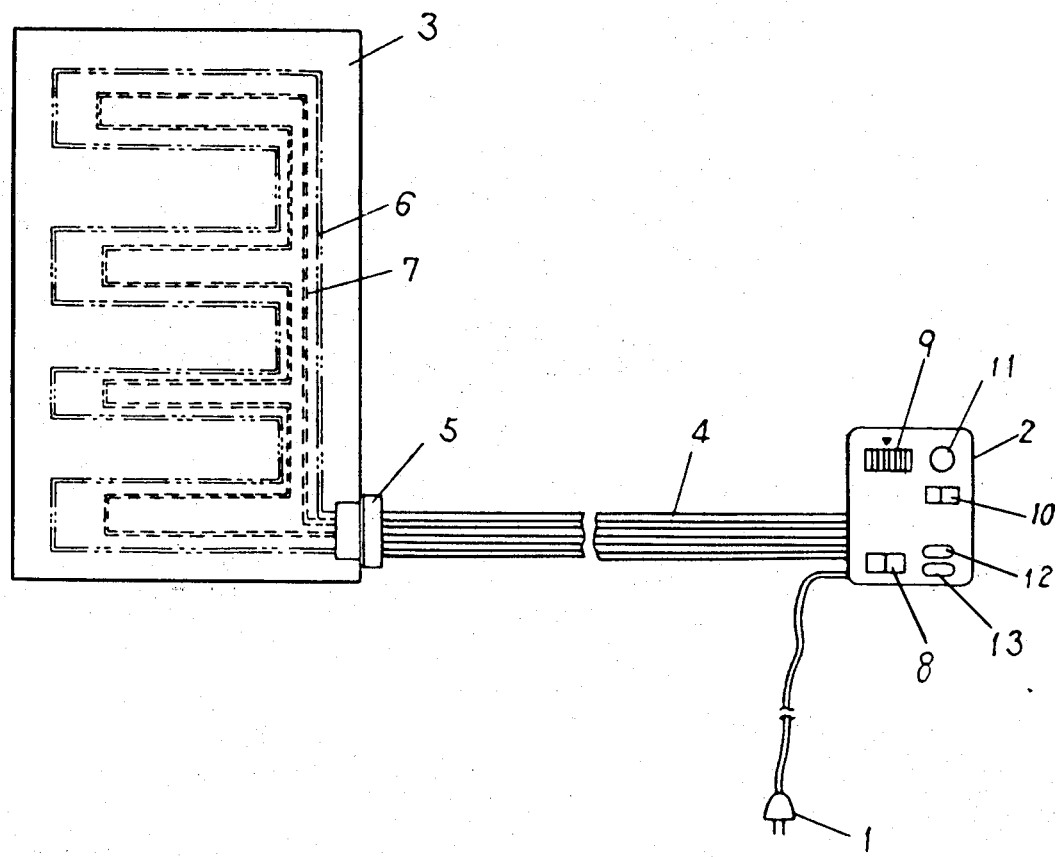
FIG. 1 is a view showing the appearance of an electric blanket or electric bed sheet which is an application of this invention.
Figure 6:
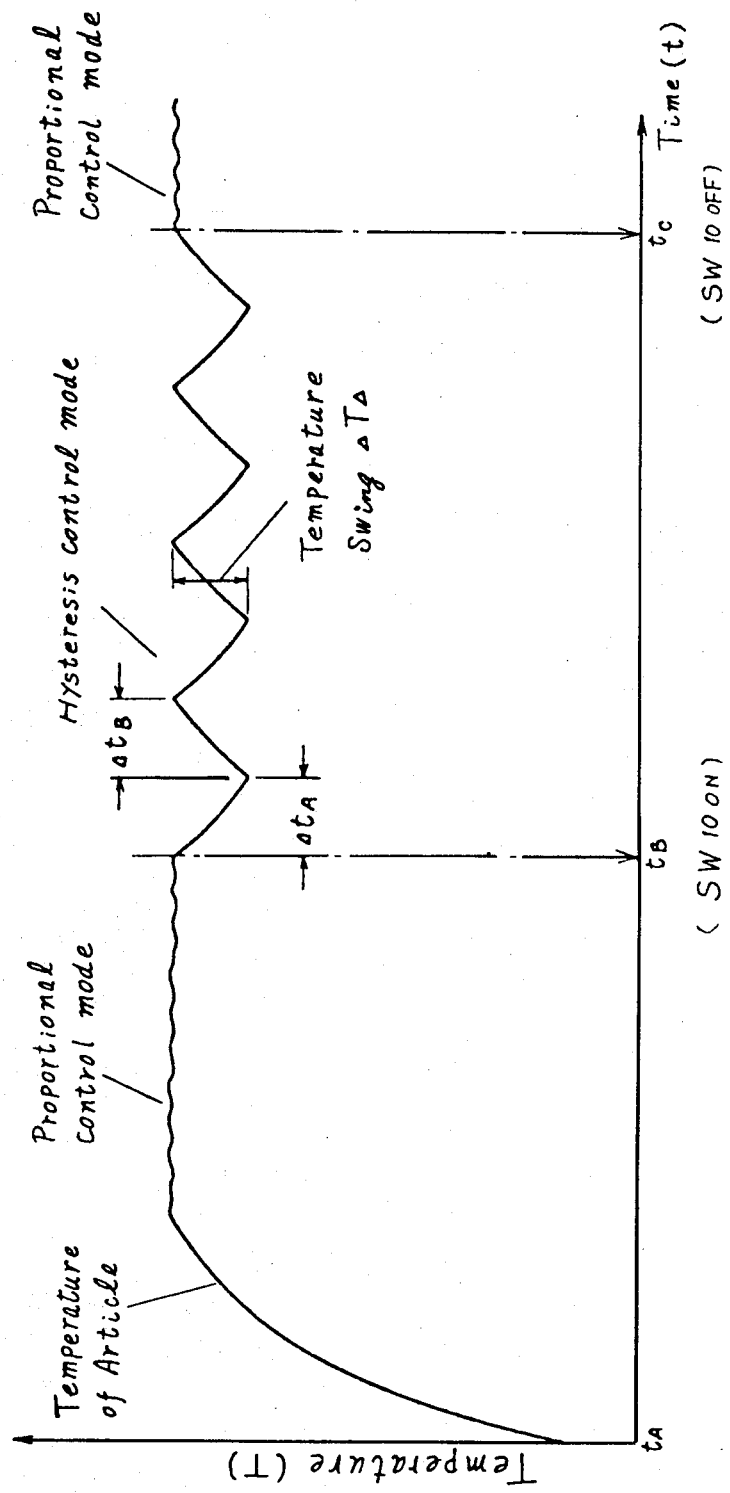
FIG. 6 is a diagram showing the characteristics of proportional control mode and of hysteresis control mode.
Figure 7:
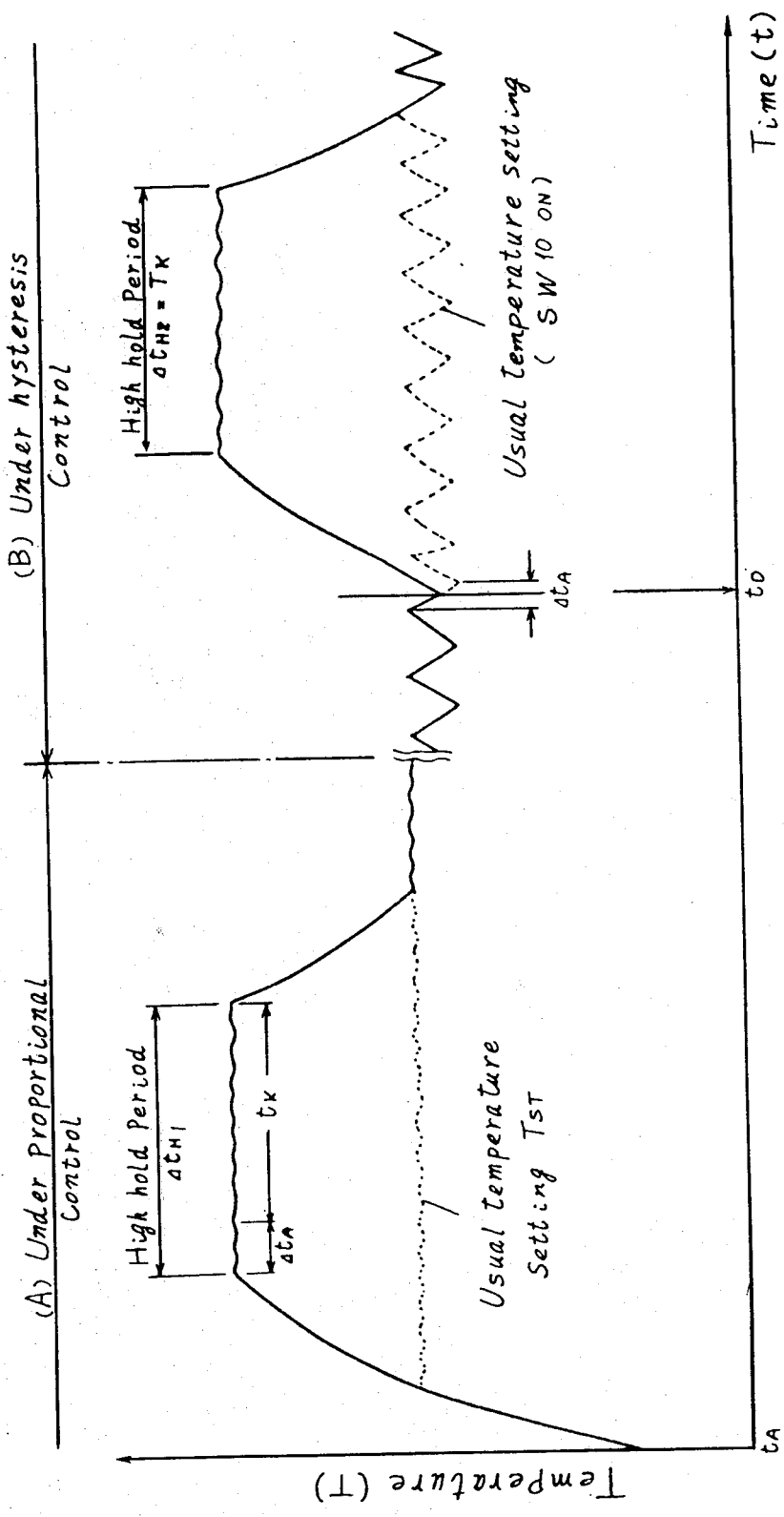
FIG. 7 is a diagram showing a high hold mode.

With reference to FIG. 1, indicated at 1 is a plug for connection to an a-c 100 V power supply, at 2 a controller box, and at 3 the article to be heated, such as a blanket for use as an electric blanket or a bed sheet for use as an electric sheet. The drawing further shows a connecting cord 4, a connector 5, a heater 6, a temperature sensor 7 for detecting the temperature of the article 3 to be heated, a power supply switch 8, a dial 9 for setting the temperature of the article 3, and a switch 10 for selecting one of two modes for controlling the temperature of the article 3 as seen in FIG. 6. One of the two control modes is a proportional control mode in which the temperature of the article 3 is controlled to a constant level at all times, while the other control mode is a hysteresis control mode in which the temperature of the article 3 varies through a predetermined range of temperatures. Indicated at 11 is a switch for initiation a high setting operation. The switch 11, when selectively operated, selects one of two control modes as shown in FIG. 7. One of the two modes is a high hold mode in which the article 3 is heated at a temperature of high level for a specified period of time independently of the temperature set by the dial 9 and is thereafter returned to the temperature set by the dial 9. The other mode is a normal mode, other than the high hold mode, in which the temperature is controlled to the level set on the dial 9. Indicated at 12 is a power supply pilot lamp, and at 13 another pilot lamp which is lighted when the heater 6 is energized.

Figure 2:
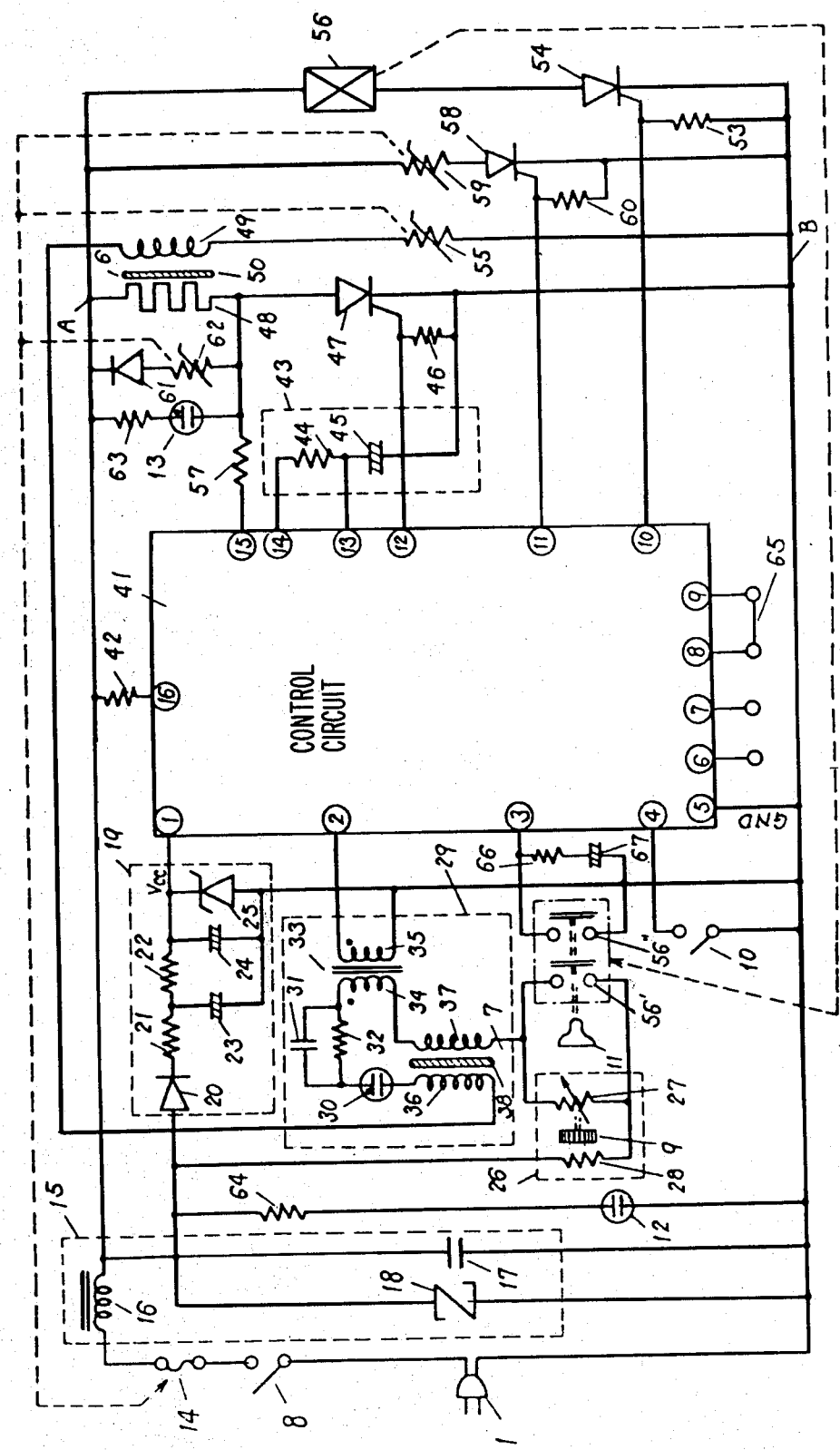
FIG. 2 is an overall circuit diagram of a temperature control circuit embodying the invention and useful for the blanket or sheet.
Figure 3:
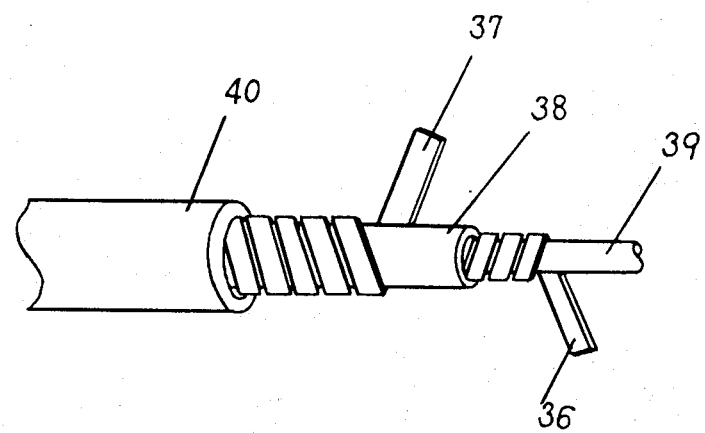
FIG. 3 is a diagram showing the construction of a temperature sensor.
Figure 4:
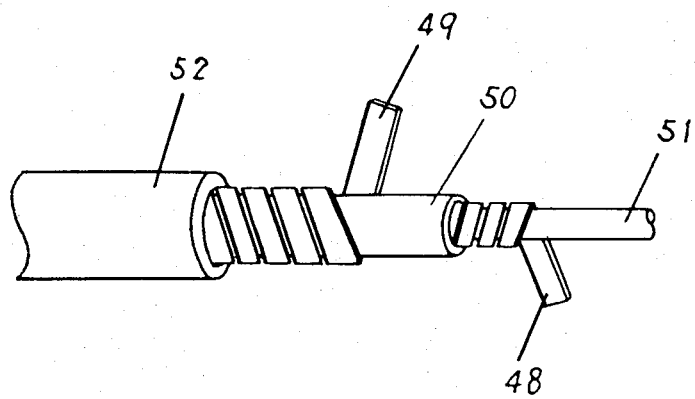
FIG. 4 is a diagram of the construction of a heater.
Figure 5:
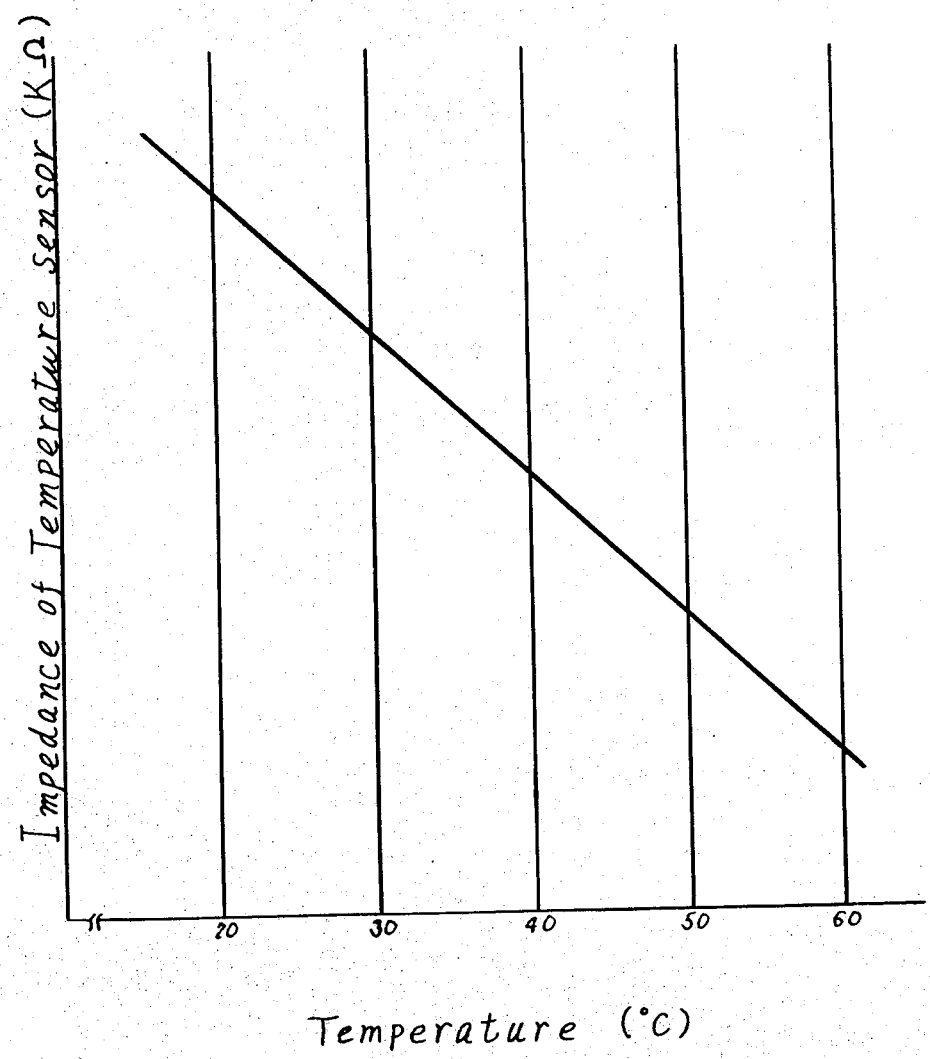
FIG. 5 is a diagram showing the temperature-impedance characteristics of the sensor.

FIG. 2 shows the overall electric circuit for an embodiment of this invention. The drawing shows the power supply plug 1, the power supply switch 8, a temperature fuse 14, and a noise filter 15 for the power supply comprising a choking coil 16, a capacitor 17, and a surge absorber 18. Indicated at 64 is a protective resistor for the power supply pilot lamp 12, and at 19 a circuit for giving a control power supply Vcc. The circuit 19 comprises a diode 20, resistors 21, 22, capacitors 23, 24 and a Zener diode 25. A temperature setting circuit 26 comprises a variable resistor 27 giving a variable resistivity in accordance with the setting of the dial 9, and a limiting resistor 28. A temperature detecting circuit 29 comprises a neon lamp 30 serving as a pulse trigger element, a capacitor 31, a resistor 32, a pulse transformer 33 and the temperature sensor 7. The temperature sensor 7 has the construction shown in FIG. 3 and in the form of a string. The sensor 7 comprises a core wire 39, a winding 36 around the core wire 39, a temperature-sensitive element 38 comprising a plastics thermistor covering the winding 37, another winding 37 around the element 38 and a sheath covering the winding 37. Since the characteristics of the temperature-sensitive element 38 vary with temperature, the layer impedance $Z_7$ between the windings 36 and 37 has the characteristics as shown in FIG. 5. With the temperature detecting circuit 29, the voltage is divided in accordance with the set resistivity Rx determined by the temperature adjusting resistor 27 (i.e. the sum of the value $R_{27}$ of the resistor 27 and the value $R_{28}$ of the limiting resistor 28, $Rx = R_{27} + R_{28}$) and with the impedance $Z_7$ of the temperature sensor 7. When the voltage $V_{z7}$ across the windings 36 and 37 is greater than the discharge start voltage $V_{B0}$ of the neon lamp, namely when $V_{B0} < V_{z7}$, the neon lamp 30 is triggered, permitting the pulse transformer 33 to function by way of the capacitor 31 and resistor 22 to deliver output. This takes place when the article 3 has a low temperature. The neon lamp 30 is not triggered when $V_{BO} > V_{z7}$, namely when the article 3 is at a high temperature. A control circuit 41 performs a predominant controlling operation and comprises an inegrated circuit (hereinafter referred to simply as "IC"). IC has 1st to 16th pins. A resistor 42 detects the a-c line voltage and times the IC 41 with the a-c. The high level operation switch has contacts 56' and 56" which are closed by pulling the knob of the switch 11 and connected to the 3rd pin on IC 41. A C-R circuit 43 for triggering a thyristor 47 to be described later comprises a resistor 44 and a capacitor 45. The output of the temerature detecting circuit 29 (when the article 3 is at a lower temperature than the set value) is fed to the 2nd pin of IC 41, which delivers output from the 14th pin to the trigger C-R circuit 43 to charge the capacitor 45 by way of the resistor 44. When the a-c line voltage thereafter approach the positive cycle and crosses the zero point, the capacitor is discharged via the 13th pin, and the thyristor 47 is triggered via the 12th pin at zero cross. The thyristor 47 energizes the heater 6. Indicated at 46 is a gate resistor. The heater 6, having the construction shown in FIG. 4, comprises a core wire 51, a heating wire 48 wound around the core wire 51, a meltable resin covering 50 fitting around the wire winding 48, a safety wire 49 wound aroung the covering 50 and a sheath 52 covering the winding 49. The heater is in the form of a string. Should the heater 6 be heated accidentally to an abnormally high temperature, the resin covering 50 melts to permit the heating wire 48 to contact the safety wire 49, whereupon a great current flows through the circuit of: point A—heater wire 48—contact portion—safety wire 49—resistor 55—point B shown in FIG. 2, heating the reistor 55, which in turn heats the fuse 14 to thermally break the fuse and interrupt the flow of current for safety. Under the normal condition, a small current of temperature sensing signal flows through the circuit of: resistor 55—safety wire 49—temperature sensor 7—temperature setting resistor 27, but the resistor 55 will not generate heat with this current. The 10th pin of the IC 41 is an output terminal for discontinuing high setting operation. When a gate resistor 53 and a thyristor 54 are triggered, a coil 56 is energized, whereby the contacts 56' and 56" of the high setting holding switch are opened. Next an arrangement for assuring the safety of the self-triggered state of the thyristor 47 will be described. A resistor 57 checks the terminal voltage of the thyristor 47 for energizing the heater 6. When the thyristor 47 is in a half-wave conductive state despite the absence of output from the temperature detecting circuit 29, and accordingly despite the absence of input to the 2nd pin of the IC 41, the thyristor 47 is in a self-triggered state, hence hazardous. In this state, the thermal voltage of the thyristor 47 is received at the 15th pin on the IC 41 by way of the resistor 57 and subjected to logic operation within the IC 41 to deliver triggering output for a thyristor 58 from the 11th pin. The output brings the thyristor 58 into conduction, causing a resistor 59 to generate heat which heats the temperature fuse 14 and thermally cut the fuse. When the thyristor 47 completely fails due to short-circuiting, safety is ensured in the following manner. Since an excess of current passes through the heater 6 at this time, entailing hazard, negative half-cycle voltage is applied to a resistor 62 through a diode 61, whereby the resistor 62 is caused to generate heat which thermally breaks the fuse 14 to interrupt the flow of current.

Figure 8:
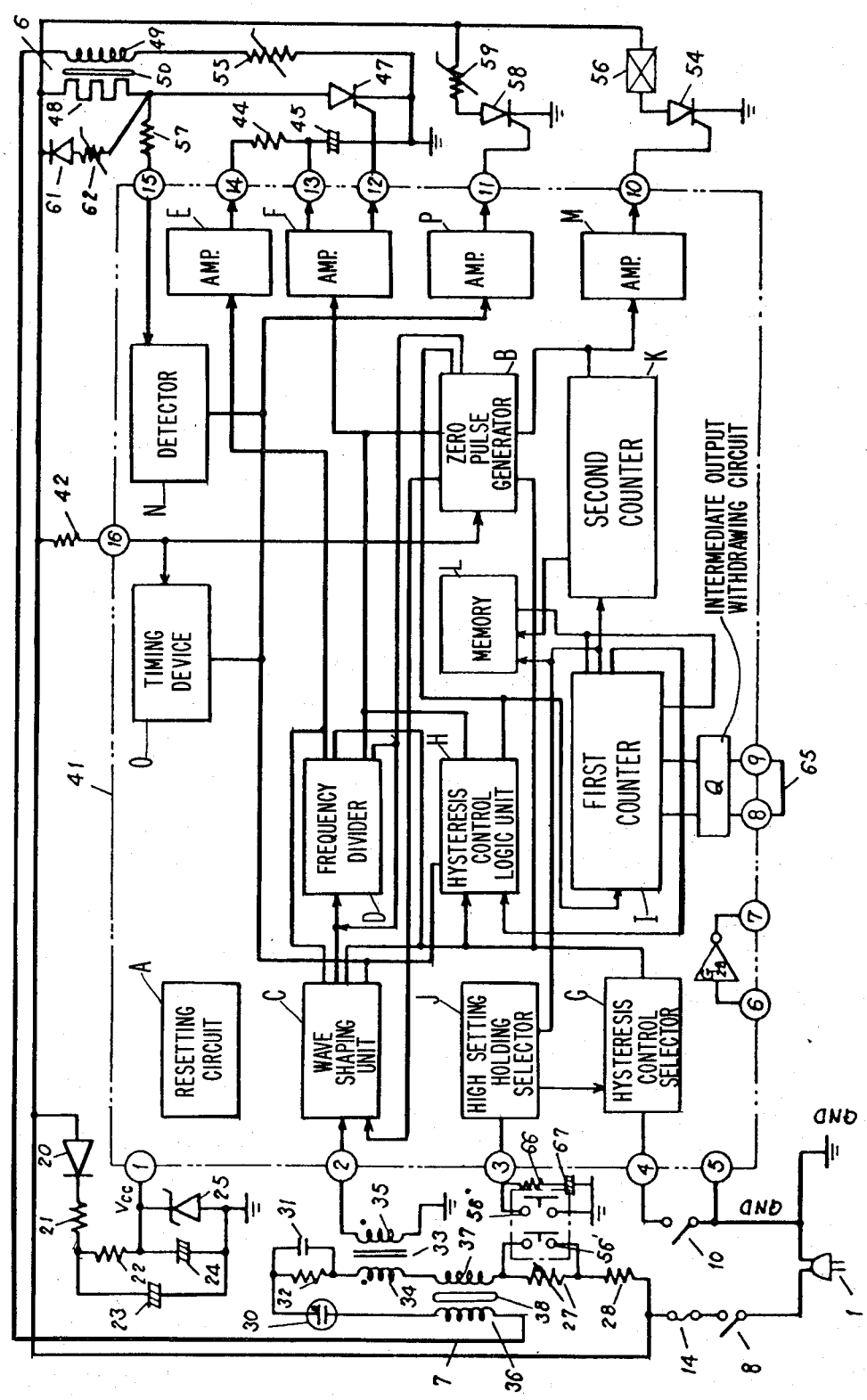
FIG. 8 is a circuit diagram in which the control circuit is shown in a block diagram.

FIG. 8 shows the control blocks of the IC 41. In FIG. 8, the interior of the IC 41 is defined by a two-dot-and-dash line, and the external parts for IC 41 irrelevant to the features of this invention are not shown. FIG. 8 shows a resetting unit A, and a zero pulse generator B which detects through the resistor 42 the zero cross voltage on the a-c line serving as the time base of IC control to form zero cross pulses. A wave form shaping unit C receives the output of the temperature sensor 7 from the pulse transformer 33 in the form of pulses and shapes the output to a specified wave form. A 2-bit frequency divider D receives temperature detecting output from the wave shaping unit C and produces trigger pulses at the zero cross when the a-c line voltage turns positive or negative. A charging amplifier E charges the capacitor 45 through the resistor 44. A discharging amplifier F receives the charge stored in the capacitor 45 via the 13th pin and feeds out the charge through the 12th pin to trigger the thyristor 47. A hysteresis control selector G receives via the 4th pin a signal from the switch 10 which closes on selecting hysteresis control. A hysteresis control logic unit H stops the 2-bit frequency divider D for a period of time $\Delta tA$ shown in FIG. 6 to provide a temperature swing for the article 3. A first counter I comprising T-type flip-flops connected together in n stages counts up the power supply frequency for the time $\Delta tA$ mentioned with respect to the hysteresis control logic unit H to hold the thyristor 47 out of operation during this period. When the time specified for the counter I has elapsed, the resetting unit A resets the hysteresis control logic unit H to trigger the thyristor 47 again. A second counter K comprising T-type flip-flops connected in n stages determines the high setting holding period $\Delta tH$ to be described later. Indicated at J is a high setting holding selector. When the high setting holding knob 11 is manipulated, the contacts 56' and 56" close. With the contact 56' closed, the temperature setting resistor 27 is bypassed to result in the highest temperature setting irrespective of the setting on the resistor 27. With the 3rd pin connected to the closed contact 56", the high setting holding selector J brings the hysteresis control counter I into direct connection with the high setting holding counter K, so that the counters I and K counts up the high setting holding time $\Delta tH$ shown in FIG. 7. When the selector J is set for high setting holding even under hysteresis control, the hysteresis control selector G does not function, permitting proportional control during the high setting operation as seen in FIG. 7.

Indicated at L is a memory for holding the high setting. The memory L renders the first counter I serviceable also as a lower counter for holding the high setting, such that during the high setting operation, the memory L stores the signal indicating that the first counter has completed counting and feeds output to the high setting holding second counter K. An output amplifier M for discontinuing the high setting holding gives output to trigger the thyristor 54, causing the coil 56 to open the high setting holding contacts 56' and 56". The diode failure, namely self-triggering of the thyristor 47 is detected by the logic between the wave form shaping unit C and a detector N for detecting the terminal voltage of the thyrister 47. For example, when there is no input voltage to the voltage detector despite the absence of the output of the wave form shaping unit C, the thyristor 47 is in a self-triggered state, so that in timed relation to a timing detector O which is switched at a suitable phase of positive cycle of the power supply, output is fed to a self-triggering amplifier P. The amplified output from the amplifier P triggers the thyristor, and the temperature fuse 14 is thermally broken with the heat generated by the resistor 59.

Figure 9:
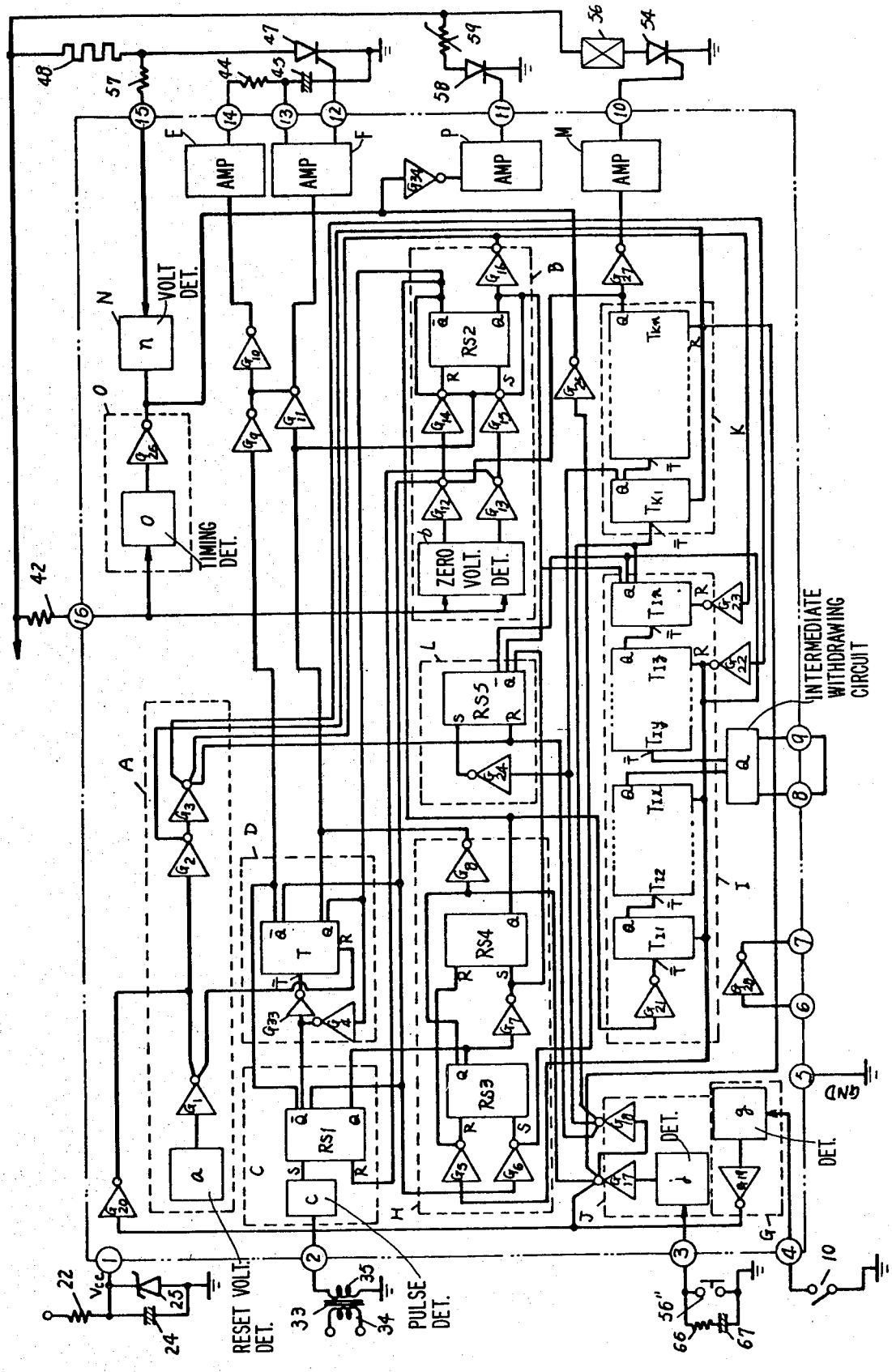
FIG. 9 is a circuit diagram showing logic circuits of the blocks included in the control circuit.

FIG. 9 shows the logic diagram of the electric circuit. The blocks A to Q in FIG. 8 is surrounded by a broken line in FIG. 9. Gates $G_1$ to $G_{28}$ are provided by the IIL process. The input is equivalent to the base of transistor, while output is of the multitransistor type with an open collector. Reset-set type flip-flops $RS_1$ to $RS_5$ are provided also by the IIL process. Indicated at T is a T-type flip-flop, at $\overline{T}$ input and at Q and $\overline{Q}$ output. Solid-line rectangular blocks a to Q are analogue circuits of the usual bipolar structure. The bipolar units a to Q will be described before the description of logic with reference to FIG. 9.

Figure 10:
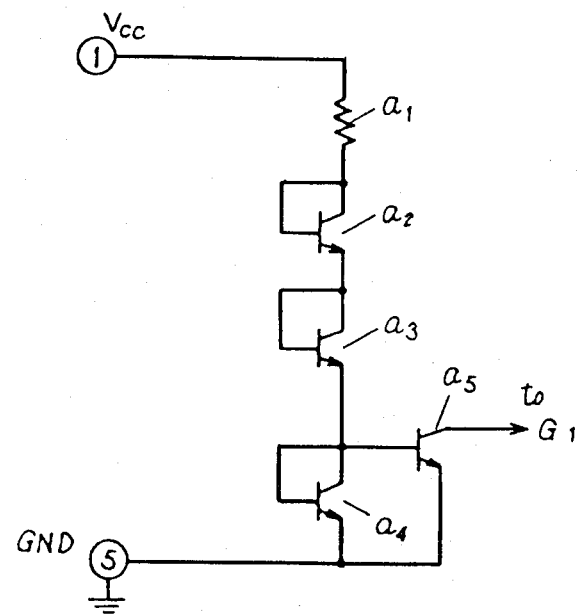
FIG. 10 is a circuit diagram showing a resetting voltage detecting circuit embodying the invention.
Figure 11:
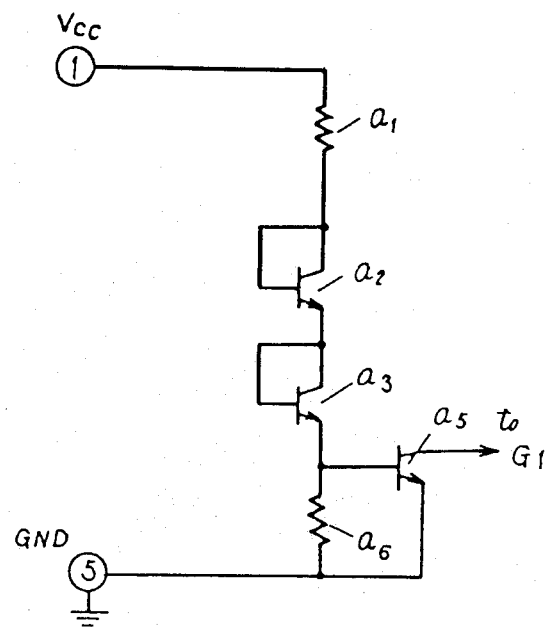
FIG. 11 is a circuit diagram showing another resetting voltage detecting circuit of the invention.
Figure 12A:
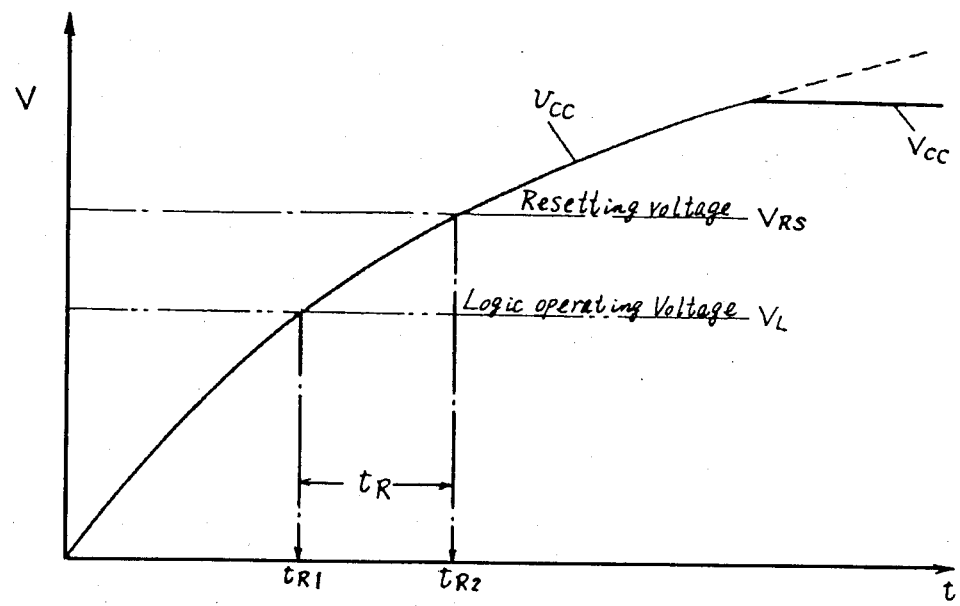
FIGS. 12a and 12b are wave form diagrams showing the operation of the voltage detecting circuits.
Figure 12B:
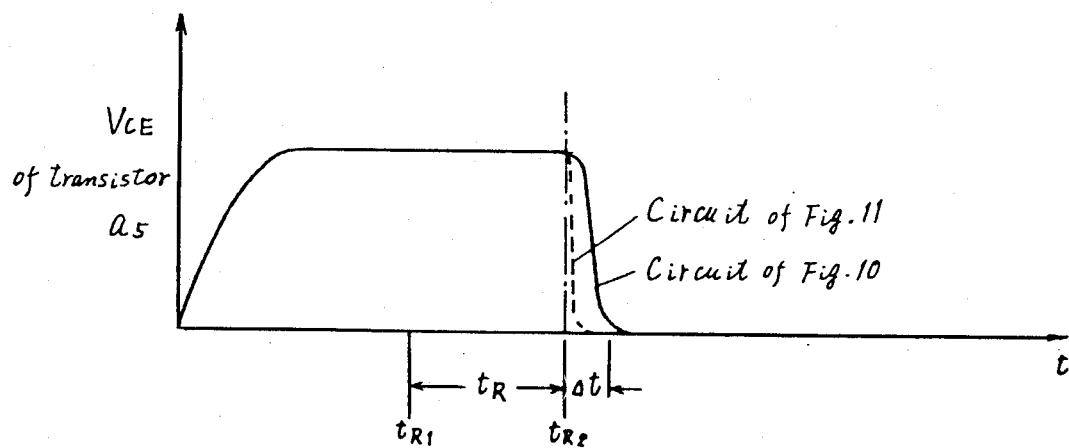

The circuit a for detecting resetting voltage with the control power supply Vcc of the resetting unit A will be described first. FIGS. 10 and 11 show embodiments of the circuit, and FIGS. 12a and 12b show the wave forms involved in the operation thereof. With reference to FIGS. 10 and 11, when the control voltage Vcc on 1st pin is increased from zero V, the transistor $a_5$ remains off until a threshold value $V_{RS}$ is reached but is brought into an on state when the $V_{RS}$ is exceeded. $V_{RS}=3\times V_{BE}$ in which the base-emitter voltage of the transistors $a_2$ to $a_4$ is $V_{BE}$. The transistors $a_4$ and $a_5$ in the circuit of FIG. 10 provides a current mirror circuit. When Vcc becomes equal to or greater than $V_{RS}$, current $I_1$ starts to flow through a resistor $a_1$, and substantially the same current as the current $I_1$ is introduced between the collector and emitter of the transistor $a_5$. In the circuit of FIG. 11, the current mirror circuit of FIG. 10 is adapted to function as a current amplifier by replacing the transistor $a_4$ by a resistor $a_6$.

FIGS. 12a and 12b show the operation of the circuits. When the power supply switch 8 is closed, the capacitors 23 and 24 of the power supply 19 function to increase the contol power supply Vcc with time as shown in FIG. 12a at vcc. When $V_{RS}$ is resetting voltage, the transistor $a_5$ remains out of conduction before time $tR_2$ as shown by the wave form of FIG. 12b. After the time $tR_2$, Vcc>$V_{RS}$, so that the transistor $a_5$ is brought into complete conduction in time $\Delta t$. Assuming that the logic unit operating voltage is $V_L$, the logic unit is brought into normal operation at time $tR_1$ but is held reset by the transistor $a_5$. At time $tR_2$, the transistor $a_5$ is turned on to bring the logic unit out of the reset state. Further when the count mirror is changed to current amplifier, the switching time $\Delta t$ for the transistor $a_5$ is shortened as seen in the wave form of FIG. 12b, resulting in a satisfactory operation.

Figure 13:
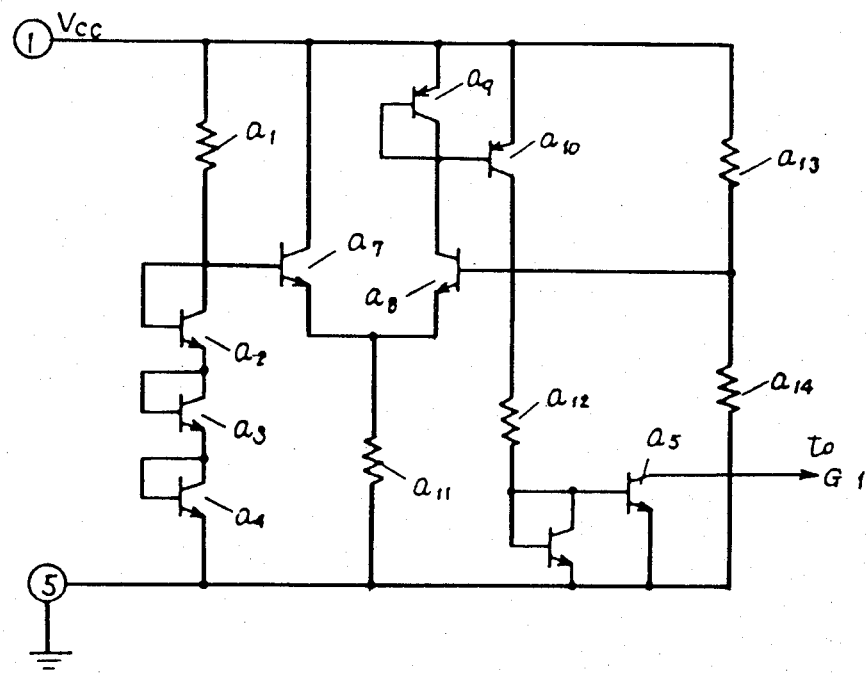
FIG. 13 is a circuit diagram showing another resetting voltage detecting circuit of the invention.

FIG. 13 shows another embodiment of the resetting voltage detecting circuit a. With a differential amplifier provided by transistors $a_7$ and $a_8$, the resetting threshold voltage $V_{RS}$ is afforded by transistors $a_2$, $a_3$ and $a_4$. The voltage $V_{RS}$ and vcc dependent on the divided voltage on resistors $a_{13}$ and $a_{14}$ are detected to determine the operation of the transistor $a_5$.

Briefly the resetting voltage detector circuit a detects the voltage increase vcc of the control power supply Vcc starting with the closing of the power, holding the transistor $a_5$ out of conduction when the control power supply Vcc is lower than the set threshold value $V_{RS}$ to reset the logic unit.

Figure 14:
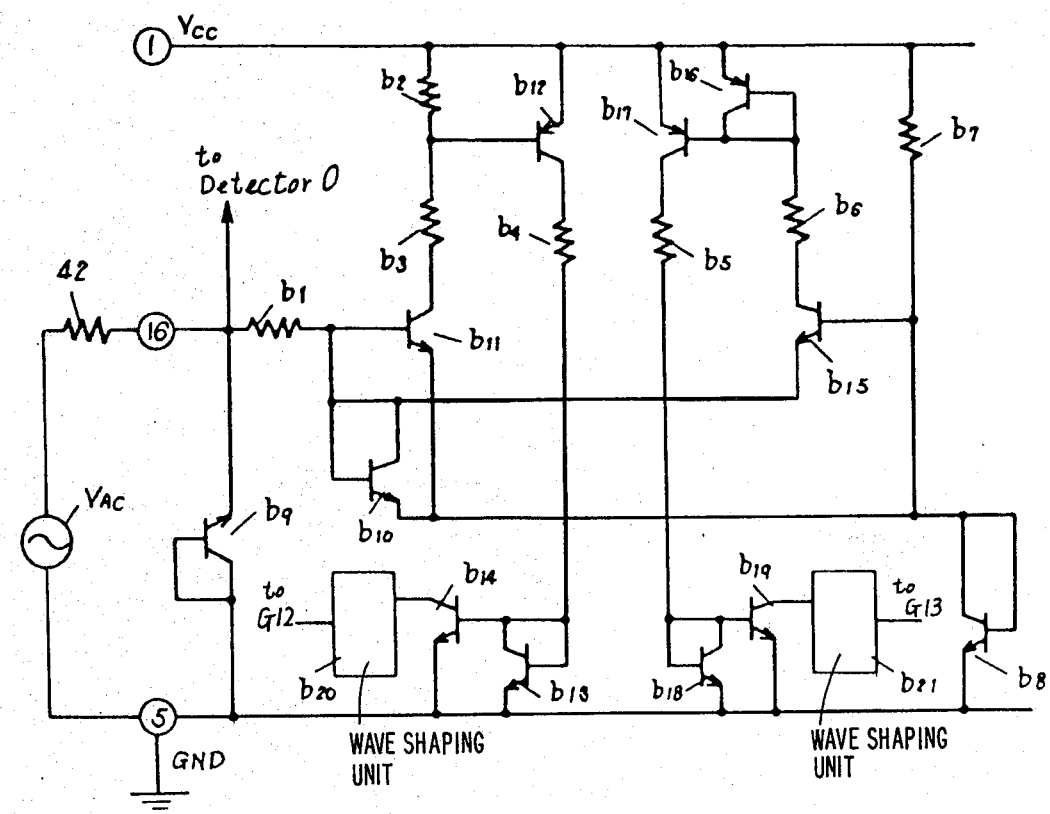
FIG. 14 is a diagram showing a zero voltage detecting circuit.
Figure 15:
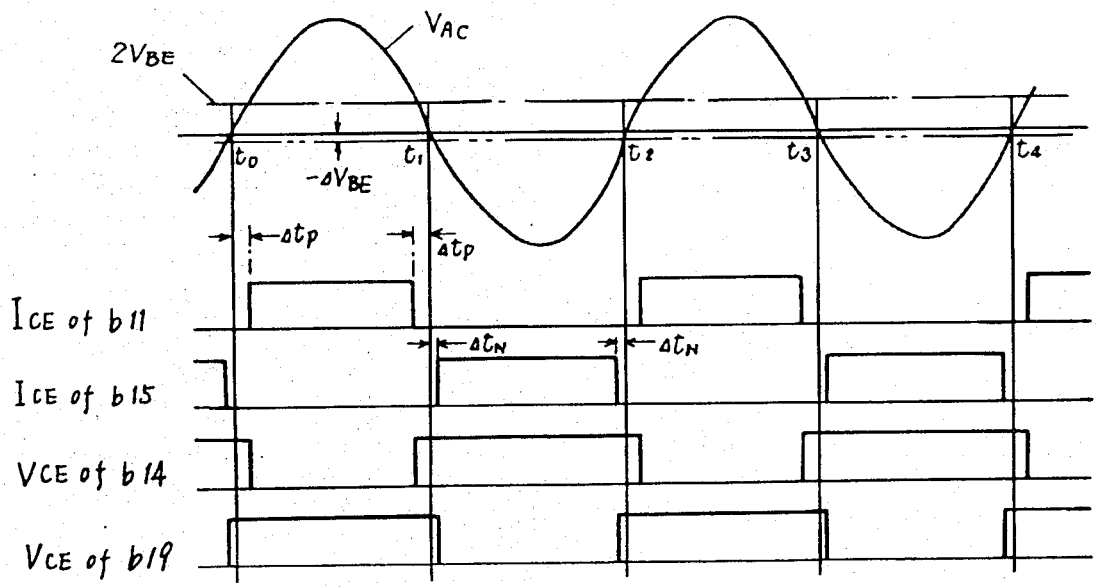
FIG. 15 is a wave form diagram showing the operation of the circuit.

A zero voltage detecting circuit b for the zero pulse generator B will be described. FIG. 14 shows an embodiment of the circuit, and FIG. 15 the wave form involved in its operation. With the circuit of FIG. 14, it is intended to obtain the wave forms of "$V_{CE}$ of $b_{14}$" and "$V_{CE}$ of $b_{19}$" shown in FIG. 15 approximately when the power supply voltage $V_{AC}$ impressed across the 16th and 5th pins crosses the zero level. The operation of the circuit of FIG. 14 will be described, starting with a reference time $t_o$ when the power supply voltage $V_{AC}$ in FIG. 15 is zero. When the power supply voltage $V_{AC}$ on the 16th pin starts to turn positive, current "$I_{CE}$ of $b_{11}$" shown in FIG. 15 starts to flow between the collector and emitter of a transistor $b_{11}$. At this time, the power supply voltage $V_{AC}$ exceeds the base voltage of the transistor $b_{11}$, namely the base-emitter voltage $V_{BES}$ of a transistor $b_8$ biased by a resistor $b_7$, bias voltage, plus the base-emitter voltage $V_{BE}$ of the transistor $b_{11}$, that is $2V_{BE} \approx V_{BE} + V_{BES}$. The time $\Delta tp$ is given by the following equation.

$$\Delta tp = \frac{1}{2\pi \cdot f} \sin^{-1} \frac{2V_{BE}}{V_{AC}}$$

where f is power supply frequency. The $I_{CE}$ through the transistor $b_{11}$ energizes through a transistor $b_{12}$ a current mirror composed of transistors $b_{13}$ and $b_{14}$, giving "$V_{CE}$ of $b_{14}$" in FIG. 15. The power supply voltage $V_{AC}$ thereafter reaches a peak value and starts to decrease toward a negative value, but immediately before time $t_1$, namely insofar as $V_{AC} \geq 2V_{BE}$, the transistor $b_{14}$ remains conductive. When $V_{AC}$ subseqeuently becomes smaller than $2V_{BE}$, the transistor $b_{14}$ is brought out of conduction, giving the wave form "$V_{CB}$ of $b_{14}$" shown in FIG. 15. A transistor $b_{10}$ forms a current mirror in combination with the transistor $b_{11}$. For reference, the current mirror is such that the base current $I_B$ through a resistor $b_1$ is approximately equal to the collector current $I_C$ through a resistor $b_3$. A wave form shaping circuit $b_{20}$ is provided to give an increased switching speed to the transistor $b_{14}$ and has the structure to be described later with reference to FIGS. 16 and 17. The input voltage and output voltage of this circuit are in phase. When the power supply voltage $V_{AC}$ in FIG. 15 starts to turn negative from zero level at time $t_1$, the base voltage of a transistor $b_{15}$ is maintained at the base voltage of the transistor $b_8$, namely the aforementioned bias voltage $V_{BES}$. When the base-emitter voltage of the transistor $b_{15}$ is $V_{BE}$, the following operation takes place if $V_{BE} > V_{BES}$ and $V_{BES} - V_{BE} = -\Delta V_{BE}$. The transistor $b_{15}$ is brought into conduction when $|V_{AC}| > |V_{BE}|$. At this time, the base current of the transistor $b_{15}$ flows from the control power supply Vcc through the resistor $b_7$, then through the base and emitter of the transistor $b_{15}$, further through the resistor $b_1$ to the power supply $V_{AC}$. This takes place $\Delta t_N$ after the time $t_1$. Accordingly current "$I_{CE}$ of $b_{15}$" shown in FIG. 15 flows through the collector of the transistor $b_{15}$, operating the transistors $b_{16}$, $b_{17}$ and $b_{18}$, $b_{19}$ providing current mirrors and giving the wave form of voltage "$V_{CE}$ of $b_{19}$" in FIG. 15. This state is maintained for a period of time immediately before time $t_2$. If $V_{BE} = V_{BES}$ and $V_{BES} - V_{BE} = 0$, the following operation takes place. Since the transistors $b_{15}$ and $b_{18}$ are identical in $V_{BE}$, the transistor $b_{15}$ functions when $V_{AC}$ equals zero V. Thus the time $t_N$ in FIG. 15 is zero. Thus "$I_{CE}$ of $b_{15}$" and "$V_{CE}$ of $b_{19}$" in FIG. 15 are obtained at $t_1$ and $t_2$. Further if $V_{BE} < V_{BES}$ and $V_{BES} - V_{BE} = +\Delta V_{BE}$, the time $\Delta t_N$ in FIG. 15 is on the left side of $t_1$, therebefore but will be some time after $\Delta t_p$. This is in reverse relation to the case in which $V_{BE} > V_{BES}$ and $V_{BES} - V_{BE} = -\Delta V_{BE}$.

Briefly the transistors $b_{14}$ and $b_{19}$ performs the switching operation shown in FIG. 15. The output wave forms are further shaped by the shaping units $b_{20}$ and $b_{21}$ shown in FIGS. 16 and 17.

Figure 16:
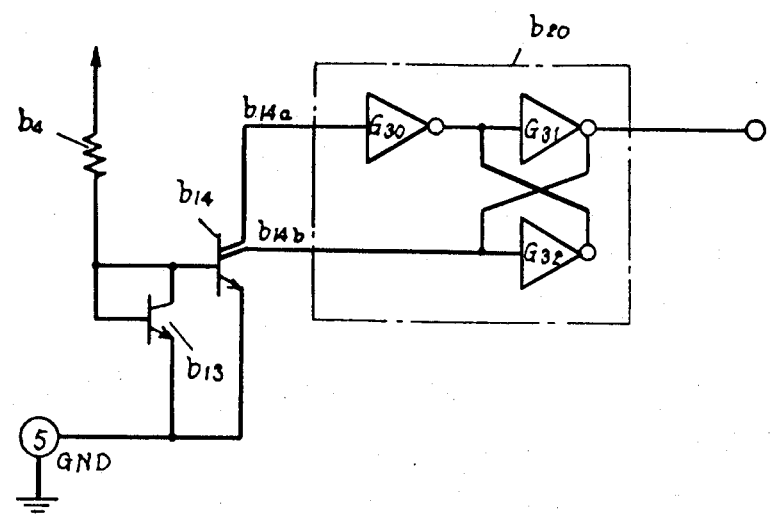
FIG. 16 is a diagram showing a wave form shaping circuit embodying the invention.

With the circuit of FIG. 16, the transistor $b_{14}$ has a multicollector, and an RS flip-flop (composed of gates $G_{31}$ and $G_{32}$) including a gage $G_{30}$ performs wave shaping. The gate 31 gives output in a sharp wave form.

Figure 17:
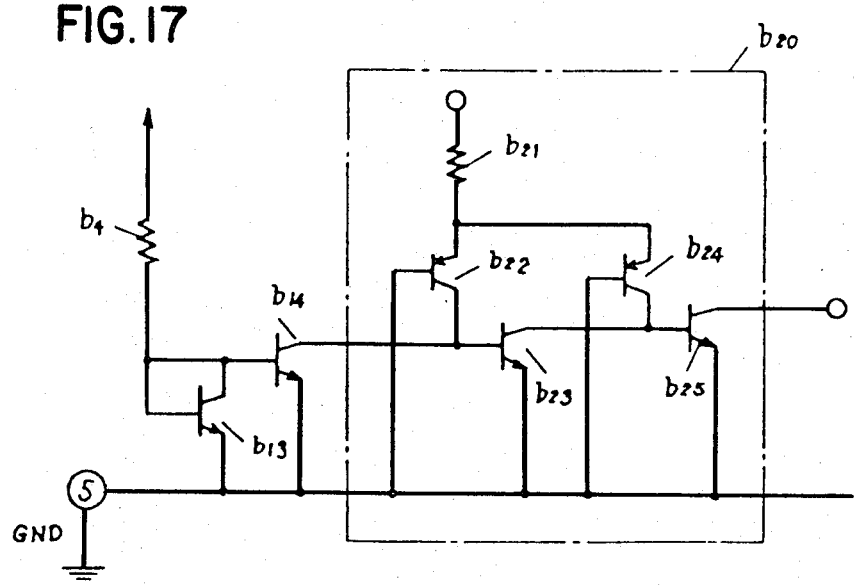
FIG. 17 is a diagram showing another wave form shaping circuit embodying the invention.

The circuit shown in FIG. 17 includes an amplifier of IIL structure serving as the wave shaping unit $b_{20}$ and comprising a gate composed of an injector resistor $b_{21}$ and transistors $b_{22}$ and $b_{23}$, and transistors $b_{24}$ and $b_{25}$ for amplifying the current.

Figure 18:
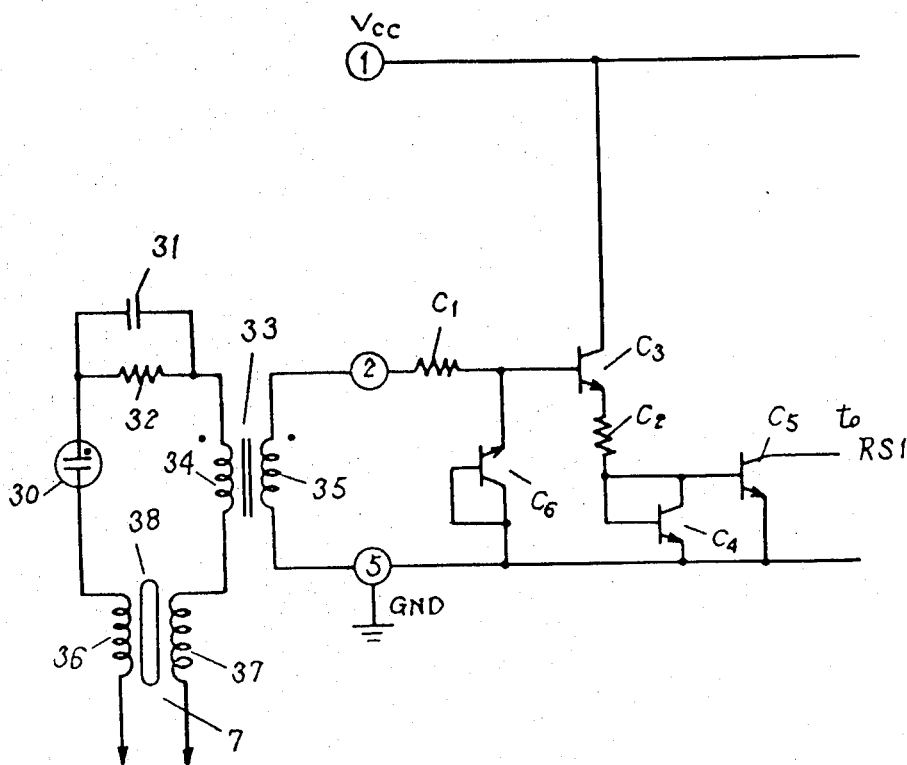
FIG. 18 is a diagram showing a pulse detecting circuit embodying this invention.
Figure 19:
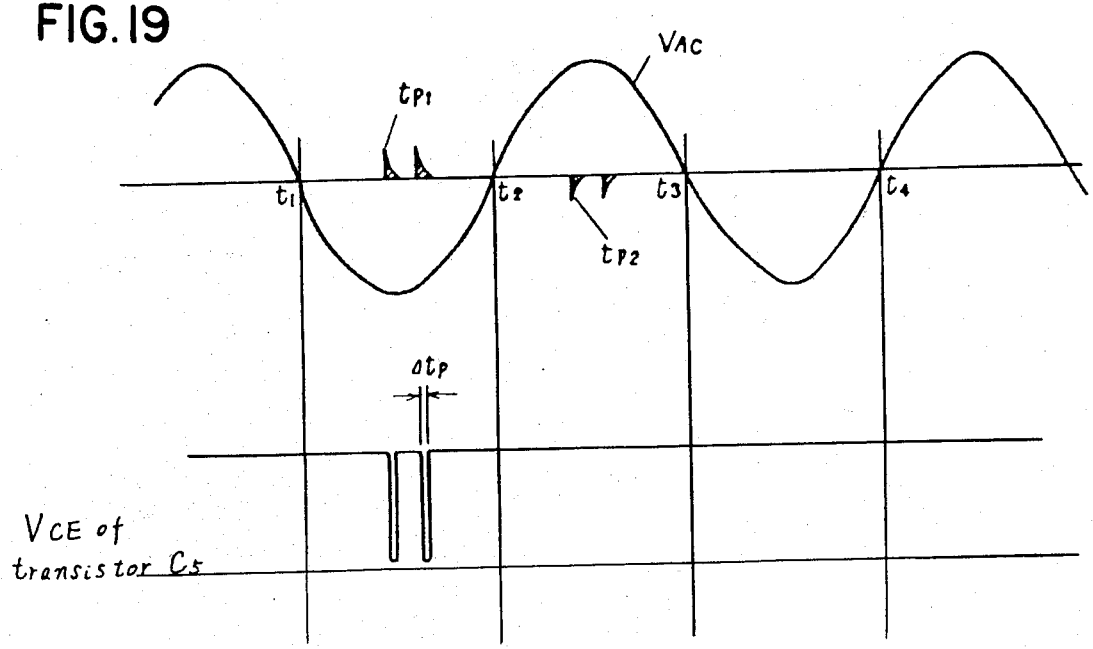
FIG. 19 is a wave form diagram showing the operation of the pulse detecting circuit.

The pulse detecting circuit c of the wave shaping unit C will be described. FIG. 18 shows an embodiment of the circuit, and FIG. 19 the wave form involved. When the article to be heated, 3, has a low temperature, the impedance $Z_7$ across the windings 36 and 37 of the sensor 7 shown in FIG. 18 is low. Accordingly when the power supply voltage $V_{AC}$ in FIG. 19 increases to the specified level, the layer voltage $V_{z7}$ of the sensor 7 exceeds the discharge start voltage $V_{BO}$ of the neon lamp 30, triggering the lamp. Consequently the secondary winding 35 of the pulse transformer 33 gives pulses of wave form $t_p$ in FIG. 19. With the transformer 33, the polarity of the windings is so determined that the pulses from the neon lamp 30, while the power supply voltage $V_{AC}$ in the negative half cycle, are reversed to negative upon transfer from the primary to secondary winding, the secondary winding thus affording pulses of positive voltage in a wave form $t_{p1}$. Thus the circuit is adapted to detect the temperature when the power supply voltage $V_{AC}$ is in negative cycles. The wave form $t_{p2}$ produced during positive cycles is of negative voltage and is irrelevant to the subsequent operation. The pulse voltage $t_{p1}$ applied across the 2nd and 5th pins shown in FIG. 18 operates an emitter follower transistor $C_3$, which in turn energizes a current mirror composed of transistors $C_4$ and $C_5$. As a result, a transistor $C_5$ functions for a period of time $\Delta t_p$ as seen in FIG. 19. The negative voltage pulses $t_{p2}$ pass through a transistor $C_6$ and resistor $C_1$, reversely biasing the transistor $C_3$, and will not operate the transistor $C_5$. During the period of time from $t_3$ to $t_4$ shown in FIG. 19, the neon lamp 30 will not be triggered with the transistor $C_5$ held out of conduction.

Briefly the pulse detecting circuit c of FIG. 18 receives the pulses $t_{p1}$ produced during the negative cycles of the power supply voltage $V_{AC}$ as effective temperature detecting signals.

Figure 20:
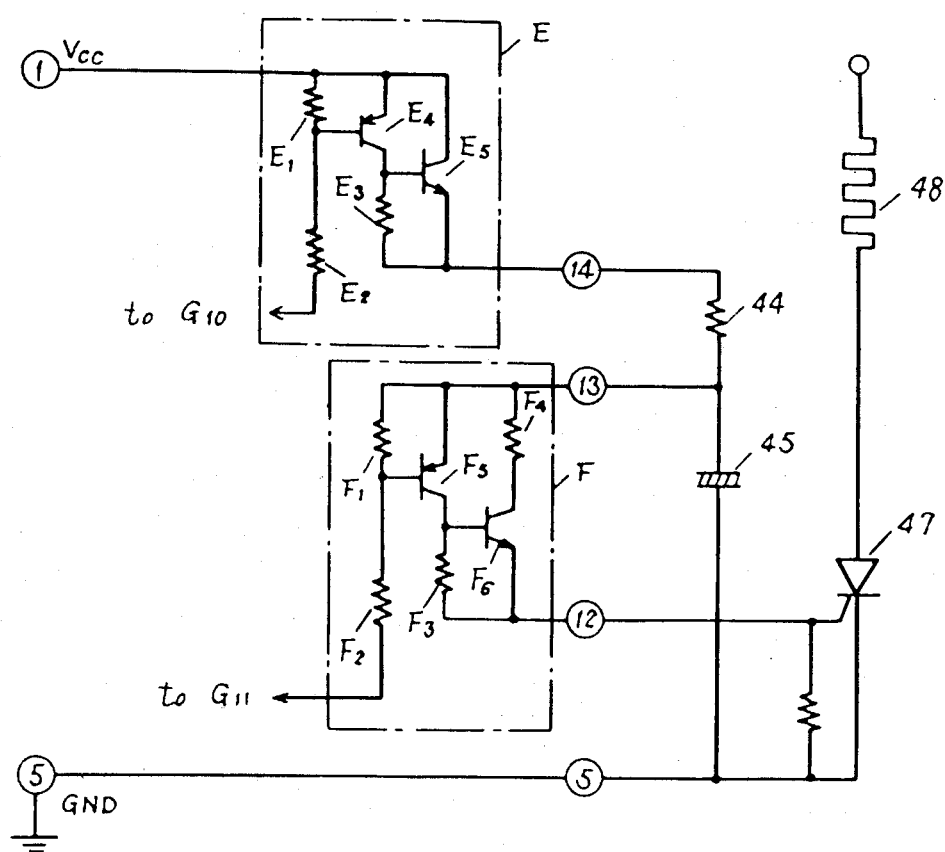
FIG. 20 is a circuit diagram showing a charging amplifier embodying the invention.

The amplifiers E and F for triggering the thyristor 47 will now be described. FIG. 20 shows embodiments of the circuits. With reference to FIG. 20, when the output of the gate $G_{10}$ drops to "0", transistors $E_4$ and $E_5$ of the amplifier E are biased and operated through resistors $E_1$ and $E_2$ to charge the capacitor 45 through the resistor 44. When the power supply voltage $V_{AC}$ crosses zero, the gate $G_{11}$ drops to "0" for a moment, whereby transistors $F_5$ and $F_6$ of the amplifier F are biased and made conductive through resistors $F_1$ and $F_2$. By this action, the charge on the capacitor 45 are discharged as pulses for a moment to trigger the thyristor 47 by way of the 12th pin. While the capacitor 45 is charged via the gate $G_{10}$, the gate $G_{11}$ is held at "1" and will not receive any discharge signal as will be described later.

Figure 21:
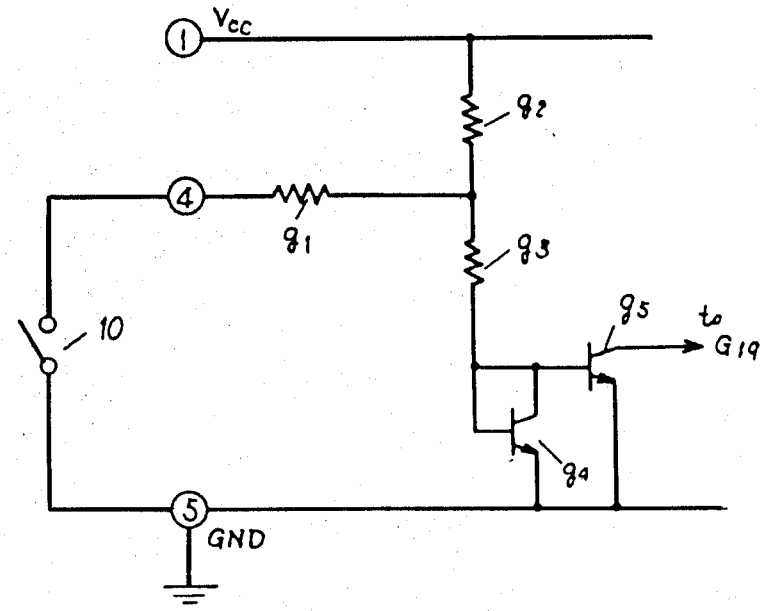
FIG. 21 is a diagram showing a hysteresis control selecting circuit embodying the present invention.
Figure 22:
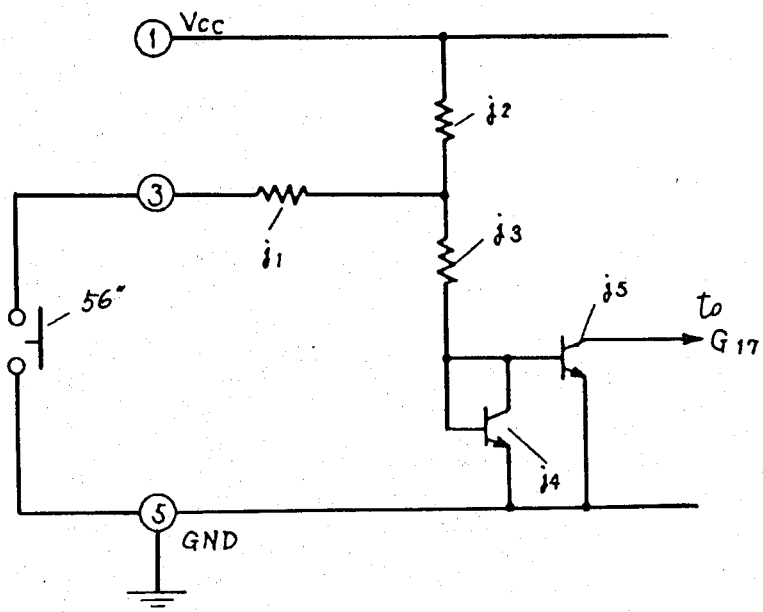
FIG. 22 is a diagram showing a high hold selecting circuit embodying the invention.

Detecting circuits g and j for the hysteresis control selector G and the high setting holding selector J will be described. FIG. 21 shows an embodiment of the circuit for the hysteresis control selector G, and FIG. 22 an embodiment of the circuit for the selector J. With reference to FIG. 21, a resistors $g_1$, $g_2$, $g_3$ and transistors $g_4$, $g_5$ provide a current mirror. The hysteresis control selecting switch 10, when closed, brings the transistor $g_5$ into conduction to set the system for hysteresis control mode. The circuit shown in FIG. 22 for the selector J is entirely identical in construction with the circuit shown in FIG. 21 for the selector G. The contact 56″ of the high setting holding switch, when closed, brings transistor $j_5$ out of conduction.

Figure 23:
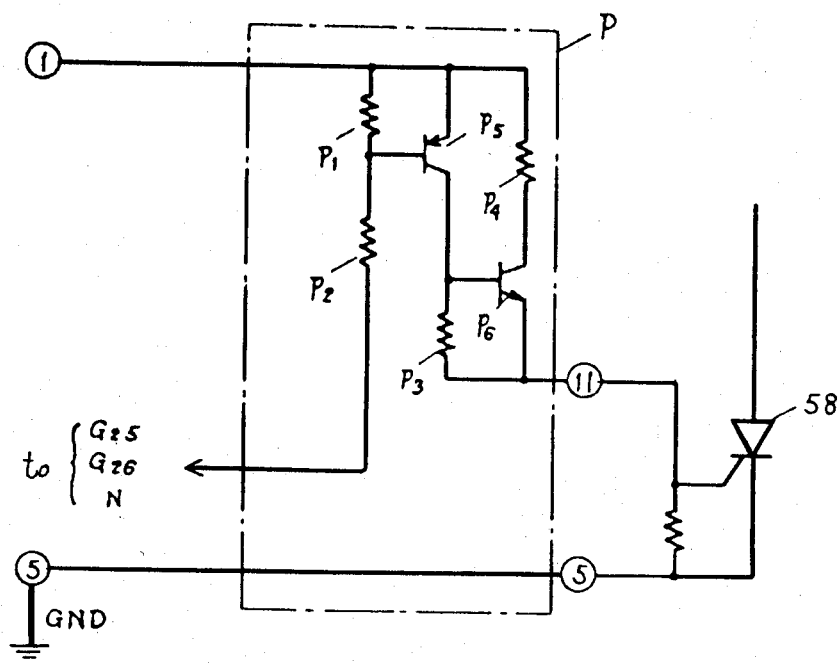
FIG. 23 is a circuit diagram showing a self-triggering output amplifier embodying the invention.

Next, the self-triggering output amplifier P and the amplifier M for discontinuing high setting operation will be described. FIG. 23 shows an embodiment of the circuit for the self-triggering output amplifier P. When the output of a gate $G_{25}$ in FIG. 23 drops to "0", transistors $p_5$ and $p_6$ are operated, triggering the thyristor 58 via the 11th pin. The circuit construction of the output amplifier M for discontinuing high setting operation is the same as one shown in FIG. 23 and will not be described.

Figure 24:
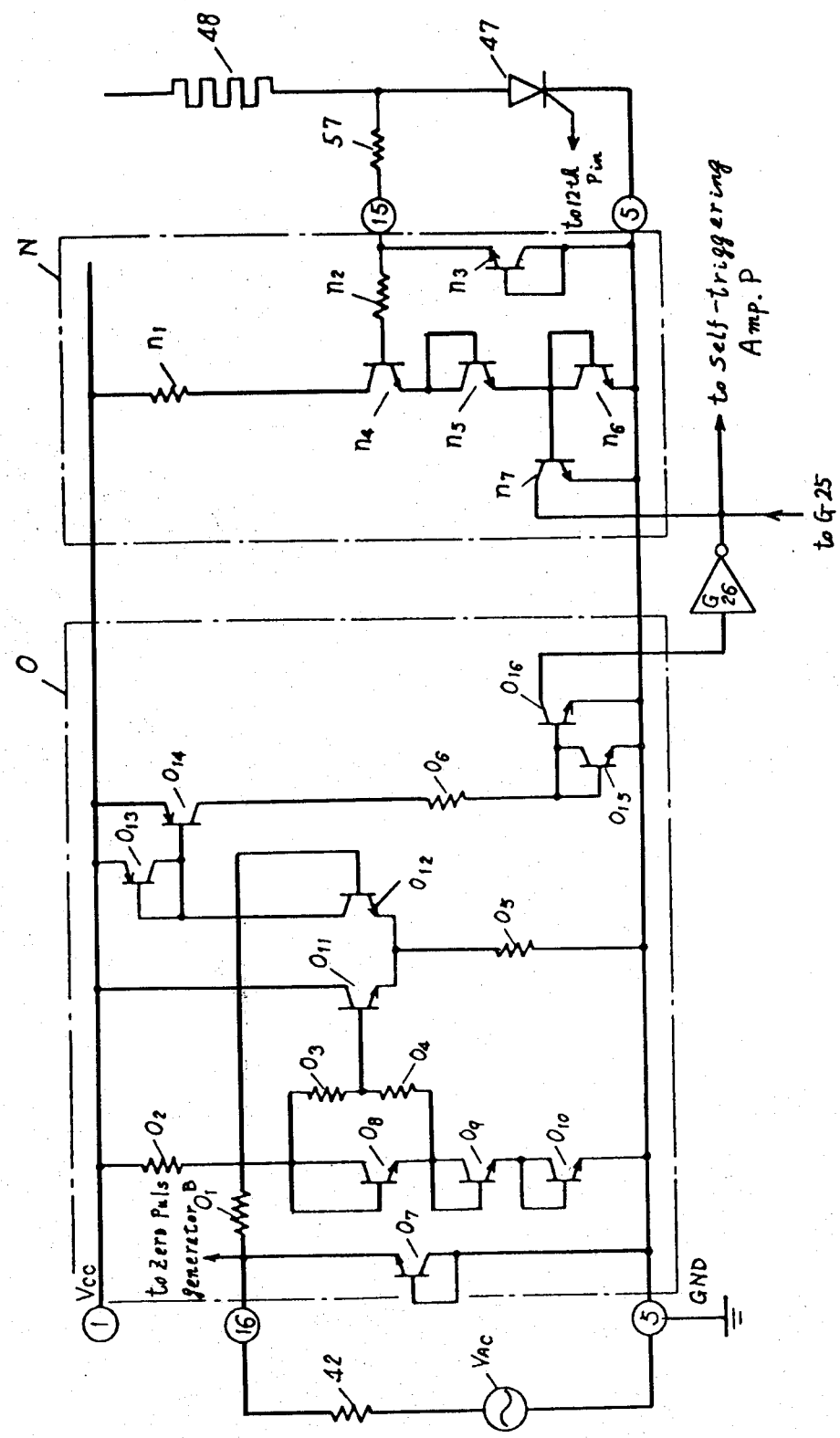
FIG. 24 is a diagram showing a voltage detecting circuit and a detecting timing circuit for a self-triggering detecting unit embodying the invention.
Figure 25:
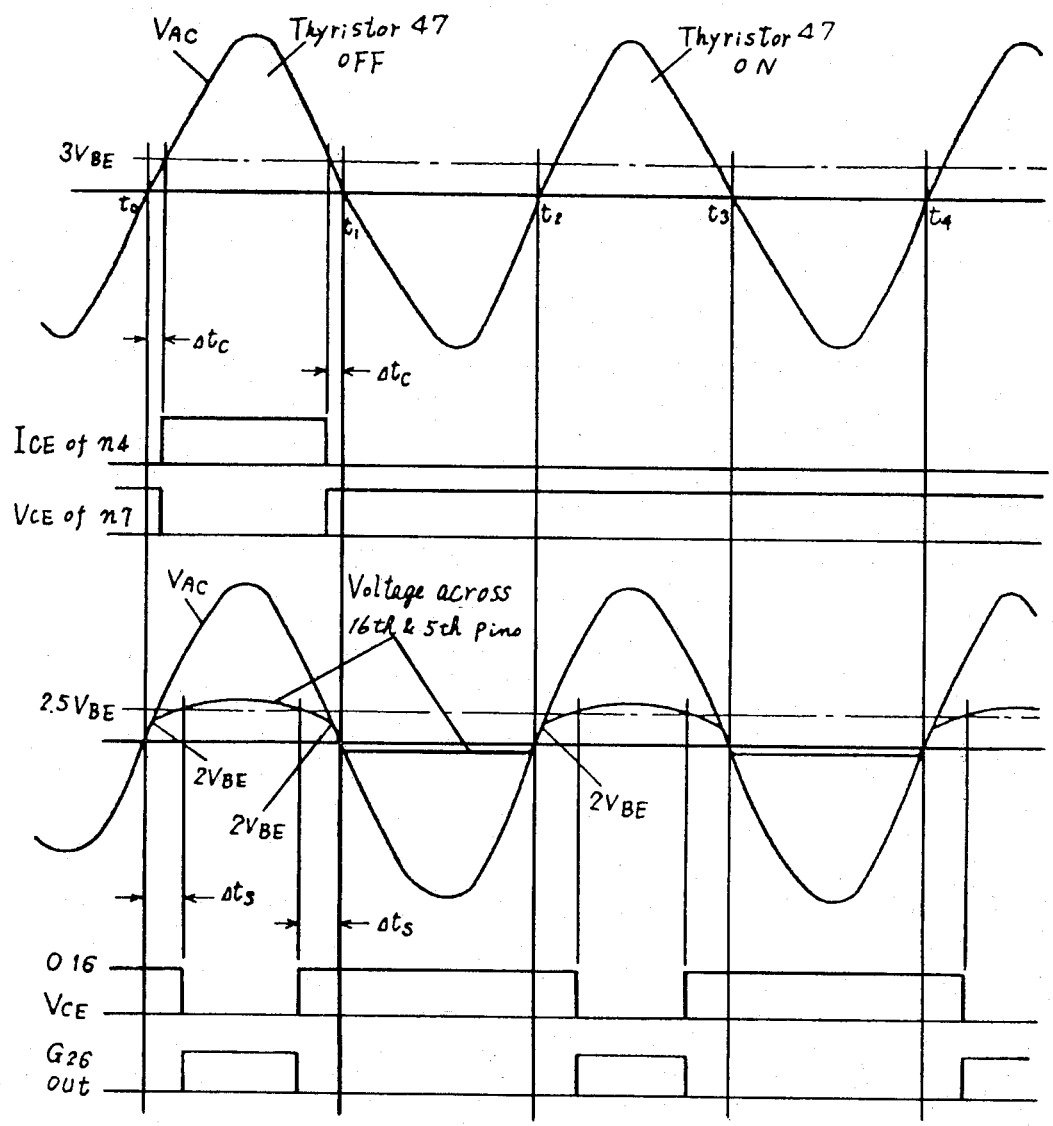
FIG. 25 is a wave form diagram showing the operation of the same.

Next, description will be given of the voltage detecting circuit N for detecting the self-triggering of the thyristor 47, and the detecting timing circuit O. FIG. 24 shows embodiments of the two circuits, and FIG. 25 the wave forms involved in the operation thereof. With reference to FIG. 24, the circuit N checks whether or not the thyristor 47 is in conduction and comprises resistors $n_1$, $n_2$ and transistors $n_3$ to $n_7$. When the transistor $n_4$ is brought into conduction, the voltage $\Delta V_a$ across the 15th and 5th pins is equal to or larger than the base-emitter voltage $3V_{BE}$ of the three transistors $n_4$, $n_5$ and $n_6$. On the other hand, the forward voltage drop $V_F$ between the anode and cathode of the thyristor 47 when it is brought into conduction is set smaller than $3V_{BE}$. Accordingly while the power supply voltage $V_{AC}$ is above the threshold voltage $3V_{BE}$ of the transistor $n_4$ after exceeding the threshold voltage in time $\Delta t_c$, with the thyristor 47 in its "OFF" state (with no signal imput to the gate), as seen in FIG. 25, collector current "$I_{CE}$ of $n_4$" shown in FIG. 25 flows through the transistor $n_4$. Consequently the collector voltage "$V_{CE}$ of $n_7$" shown in FIG. 25 of the transistor $n_7$ is "0." Until $\Delta t_c$ time before the time $t_1$ when the power supply voltage $V_{CE}$ turns negative at the zero level, "$V_{CE}$ of $n_7$" remains "0" Next when the thyristor 47 is brought into contuction, the transistors $n_4$ and $n_7$ are in "OFF" state and "$V_{CE}$ of $n_7$" is maintained as shown in FIG. 25 over the period of time $t_2$ to $t_3$. With the timing detecting circuit O, the power supply voltage $V_{AC}$ is applied to the 16th pin. The reference voltage of transistors $o_{11}$ and $o_{12}$ providing a differential amplifier is the voltage $V_{ST}$ at the midpoint between resistors $o_3$ and $o_4$. $V_{ST}=2.5V_{BE}$ in which $V_{BE}$ is the base-emitter voltage of the transistor $o_8$. This voltage is divided by the resistors $o_3$ and $o_4$ ($o_3=o_4$) to give $0.5\ V_{BE}$. Accordingly when the voltage on the 16th pin due to the power supply voltage $V_{AC}$ exceeds the voltage $V_{ST}$, transistor $o_{12}$, transistors $o_{13}$ and $o_{14}$ forming a current mirror, and transistors $o_{15}$ and $o_{16}$ similarly providing a current mirror are rendered conductive. This state is shown in FIG. 25 during a period $\Delta t_s$. As seen in FIG. 9, the voltage on the 16th pin serves as input to the zero pulse generator B. Accordingly when and after the power supply voltage $V_{AC}$ exceeds $2V_{BE}$ as shown in FIG. 15, current dividely flows to the zero pulse generator B through the resistor $b_1$ shown in FIG. 14, so that the voltage across the 16th and 5th pins gently rises from $2V_{BE}$ as seen in FIG. 25. This voltage is above $2.5V_{BE}$ (the threshold voltage $V_{ST}$ of the differential amplifier composed of the transistors $o_{11}$ and $o_{12}$) shown in FIG. 25 during a period of time $\Delta t_s$. With this circuit, $\Delta t_s$ must be made longer than $\Delta t_c$.

Figure 26:
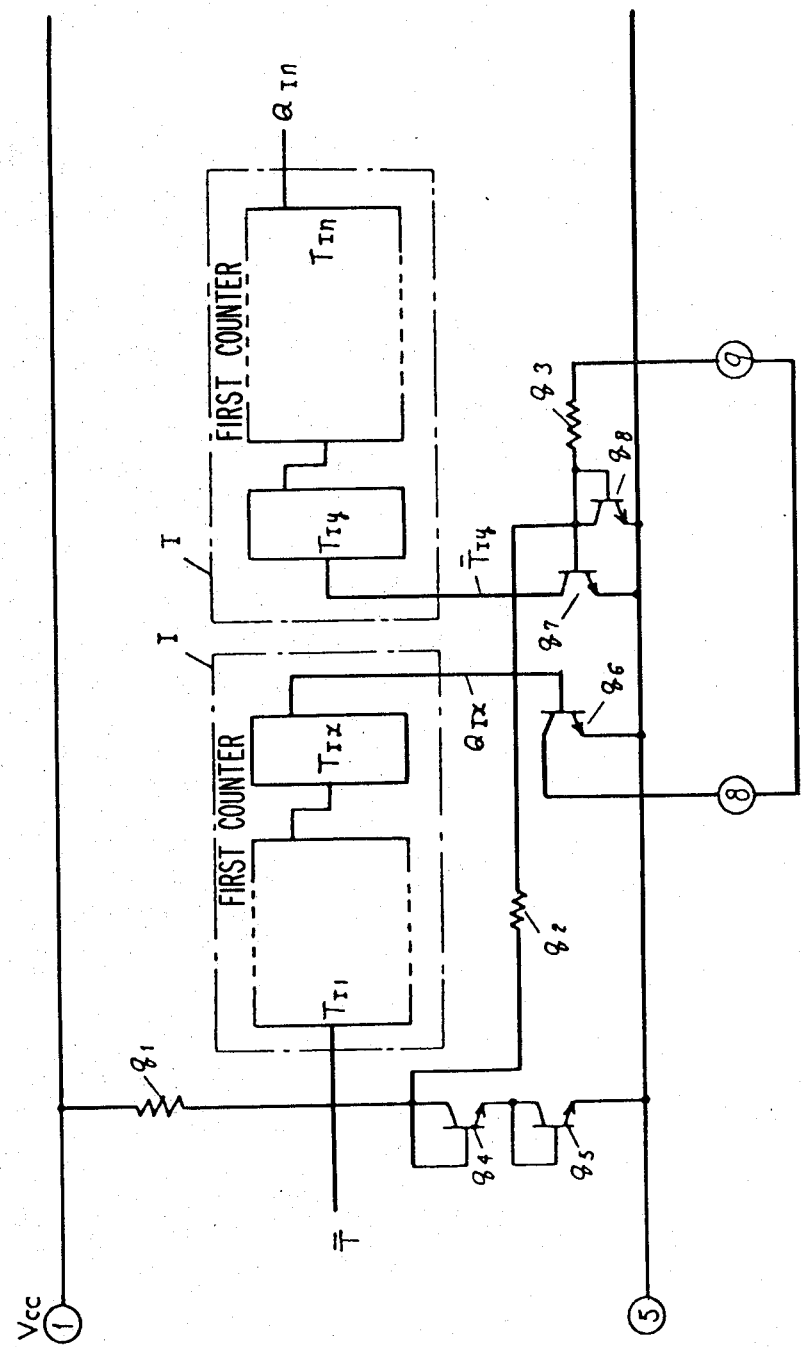
FIG. 26 is a diagram showing an intermediate output circuit for a first counter embodying the invention.

The circuit Q for withdrawing intermediate output from the multistage first counter I will be described. FIG. 26 shows an embodiment of the circuit, in which the first counter I comprises T-type flip-flops connected in n stages and is divided into two blocks, i.e. a block of $T_{I1}$ to $T_{Ix}$ and a block of $T_{Iy}$ to $T_{In}$. With this counter I, the output $Q_{Ix}$ of one block and the input $\overline{T}_{Iy}$ to the other block, when directly coupled, provide a directly coupled counter. However, when checking the function of the overall circuit which includes many stages, there arises a problem in that it takes too long a time to obtain output $Q_{In}$ from the final stage even with rectangular wave input fed to $\overline{T}$ at the first stage at a high speed. Accordingly the first block including $T_{I1}$ to $T_{Ix}$ is checked for operation with input fed to $\overline{T}$ (output from the 8th pin used for judgment), separately from the checking of the second block including $T_{Iy}$ to $T_{In}$ which is performed with rectangular wave input fed to the 9th pin (output from $Q_{In}$ used for judgment). Thus to shorten the operating checking time needed, the circuit Q is inserted in the midportion of the counter I. In FIG. 26, transistors $q_4$ and $q_5$ provide a constant voltage power supply. A transistor $q_6$ serves as an ouput buffer, while transistors $q_7$ and $q_8$ provide input buffers and form a current mirror.

Control operation will be described below mainly with reference to FIG. 9.

Figure 27:
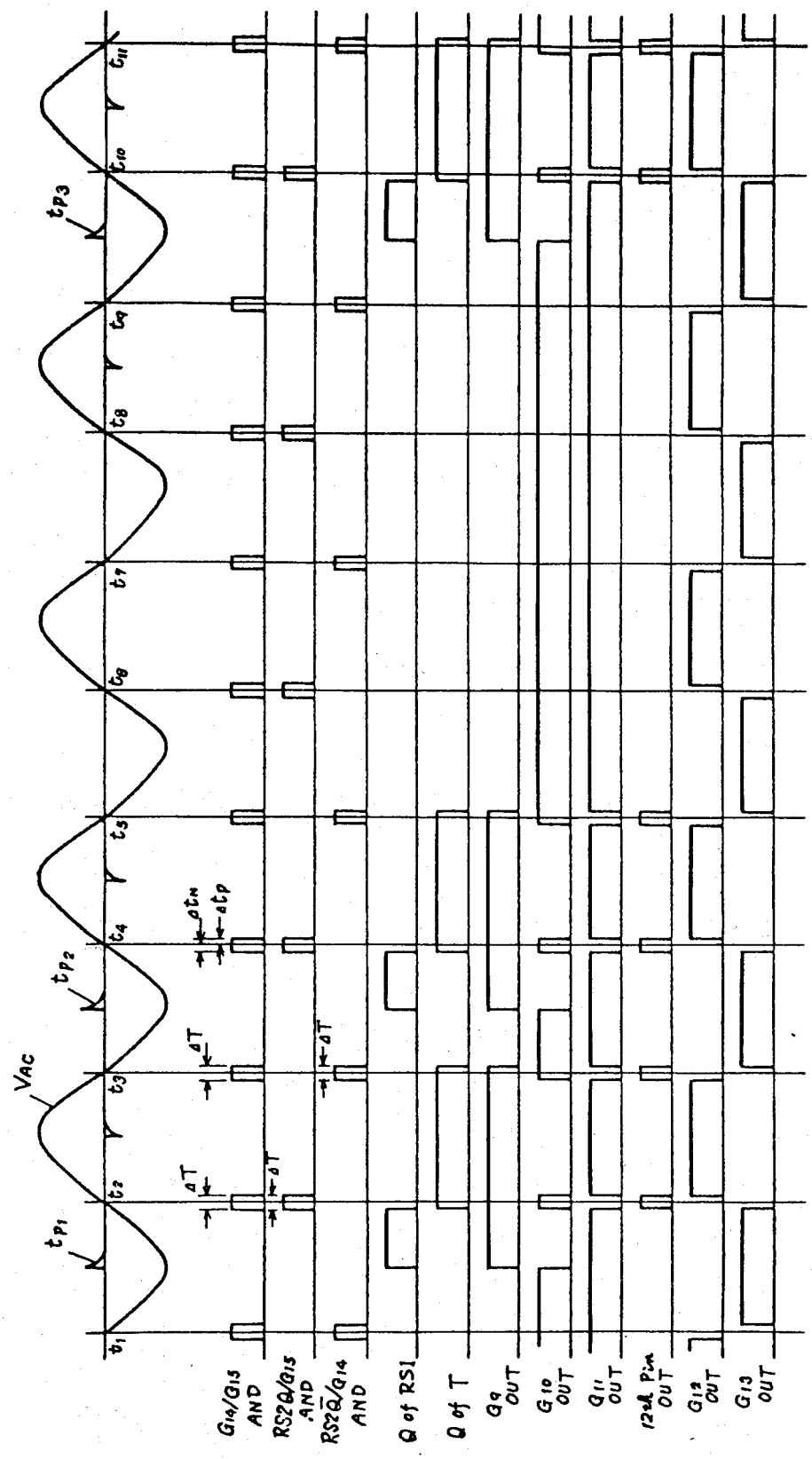
FIG. 27 is a wave form diagram showing an operation in proportional control mode.

The proportional control mode shown in FIG. 6 will be described first. For this operation, the hysteresis control selecting switch 10 is open, and the contacts 56' and 56" of the high setting holding switch are open. In this state, the power supply switch 8 is closed, and when the article to be heated, 3, has a low temperature, the system performs the operation illustrated in FIG. 27. The gate $G_{13}$ of the zero pulse generator B in FIG. 9, when "0" as seen in FIG. 27, resets the flip-flop $RS_1$ of the wave form shaping unit C. Thus during a positive half cycle of the power supply voltage $V_{AC}$ and during a short period of its negative cycle, $RS_1$ is held reset. When the temperature sensor 7 subsequently emits a pulse $t_{p1}$, the flip-flop $RS_1$ is set, whereupon the output $\overline{Q}$ of the flip-flop $RS_1$ changes from "1" to "0," so that gate $G_9$ changes from "0" to "1", and gate $G_{10}$ from "1" to "0." With the change to "0" at the gate $G_{10}$, the amplifier E is energized, starting to charge the capacitor 45 through the resistor 44. In other words, the temperature sensor 7 triggers the neon lamp 30, which in turn starts to charge the capacitor 45. Immediately before time $t_2$ when the power supply voltage $V_{AC}$ turns from negative to positive, the gate $G_{13}$ changes from "1" to "0," whereby the flip-flop $RS_1$ is reset again. With the resetting, the output $\overline{Q}$ of the flip-flop $RS_1$ returns from "0" to "1." Accordingly the signal reversed from "1" to "0" at gate $G_{33}$ is added to the input $\overline{T}$ of the T-type flip-flop T, the output Q of which therefore changes from "0" to "1" at the edge of fall of the input $\overline{T}$. Since the output Q of the T flip-flop T becomes "1," output "0" is obtained at gate $G_{11}$, changing the gate $G_{10}$ to "1" to discontinue the charging of the capacitor 45, while causing the discharge amplifier F to function to feed output to the 12th pin. Immediately after the power supply voltage $V_{AC}$ turns positive after time $t_2$, gate $G_{12}$ changes from "0" to "1," with the result that the AND output of gates $G_{14}$ and $G_{15}$ drops from "1" to "0." The period during which the output of $G_{14}$ and $G_{15}$ is $\Delta T$, during which gates $G_{12}$ and $G_{13}$ are both "0." Even after the time period T, the output Q of the T-type flip-flop T is "1," but since the AND output of gates $G_{14}$ and $G_{15}$ is "0," gate $G_{11}$ turns "1," discontinuing the charging the capacitor 45. Accordingly output from the 12th pin is generated only during $\Delta T$ at the zero cross point of the power supply voltage $V_{AC}$ near the time $t_2$ and triggers the thyristor 47, which in turn energizes the heater 48. Upon lapse of the time $\Delta T$, gate $G_{11}$ changes from "0" to "1," so that the output of gate $G_{10}$ changes from "1" to "0," thus starting to charge the capacitor 45 through the resistor 44. Near time $t_3$ at which the voltage $V_{AC}$ turns from positive to negative, a zero cross pulse $\Delta T$ and AND output of the output $\overline{Q}$ of the flip-flop $RS_2$ and the output of gate $G_{14}$ occur again. Immediately before time $t_3$ is reached, AND output of gates $G_{14}$ and $G_{15}$ changes from "0" to "1," consequently changing the output Q "1" of the flip-flop T. Gate $G_{11}$ drops to "0" to discharge the capacitor 45 again. With the gage $G_{10}$ changed from "0" to "1," the charging of the capacitor 45 is interrupted at this time. At the same time, the AND output of the output $\overline{Q}$ of the flip-flop $RS_2$ and the output of the gate $G_{14}$ changes from "0" to "1." This output is subjected to AND operation with the output Q of the T-type flip-flop T and is fed to gate $G_4$, which changes from "1" to "0," and gate $G_{33}$ changes from "0" to "1." The resulting output is added to input $\overline{T}$ to the T-type flip-flop T. In $\Delta T$ time after time $t_3$, the AND output of the output $\overline{Q}$ of the flip-flop $RS_2$ and the output of gate $G_{14}$ drops from "1" to "0." Consequently gate $G_4$ changes from "0" to "1," and gate $G_{33}$ from "1" to "0." At the edge of fall of the output of the gate $G_{33}$, the output Q of the T-type flip-flop T returns from "1" to "0." Briefly T-type flip-flop T performs one count with setting and resetting signals from the flip-flop $RS_1$, and performs two counts and returns with the AND output of the set output Q of the flip-flop T and zero cross pulse $\Delta T$ produced when the voltage $V_{AC}$ turns negative. In other words, the temperature is detected during a positive or negative cycle of the voltage $V_{AC}$, and in response to the resulting signal, a two-bit thyristor triggering pulse is emitted at a zero point when the voltage is to turn positive or negative. Although SCR is used as the thyristor 47 in FIG. 9, a TRIAC may be advantageously usable for this purpose when suited for the particular device contemplated. FIG. 27 shows that during the period of from time $t_5$ to $t_8$, there are no pulses from the sensor 7 for triggering the neon lamp 30 since the temperature of the article 3 is higher than the set level. The foregoing operation does not take place during this period because the flip-flop $RS_1$ is held in its reset position. With the gate $G_{10}$ in "1" state, the capacitor 45 will not be charged, while the output Q of the T-type flip-flop is "0" and gate $G_{11}$ is in "1" state, so that the discharge amplifier F is held out of operation. Accordingly voltage at 12th pin is zero. When the neon lamp 30 is triggered again with a reduction in the temperature of the article 3, the foregoing operation proceeds. The thyristor 47 is triggered to energize the heater 48. Thus the temperature can be controlled in the proportional control mode shown in FIG. 6 through the series of operations described.

Figure 28:
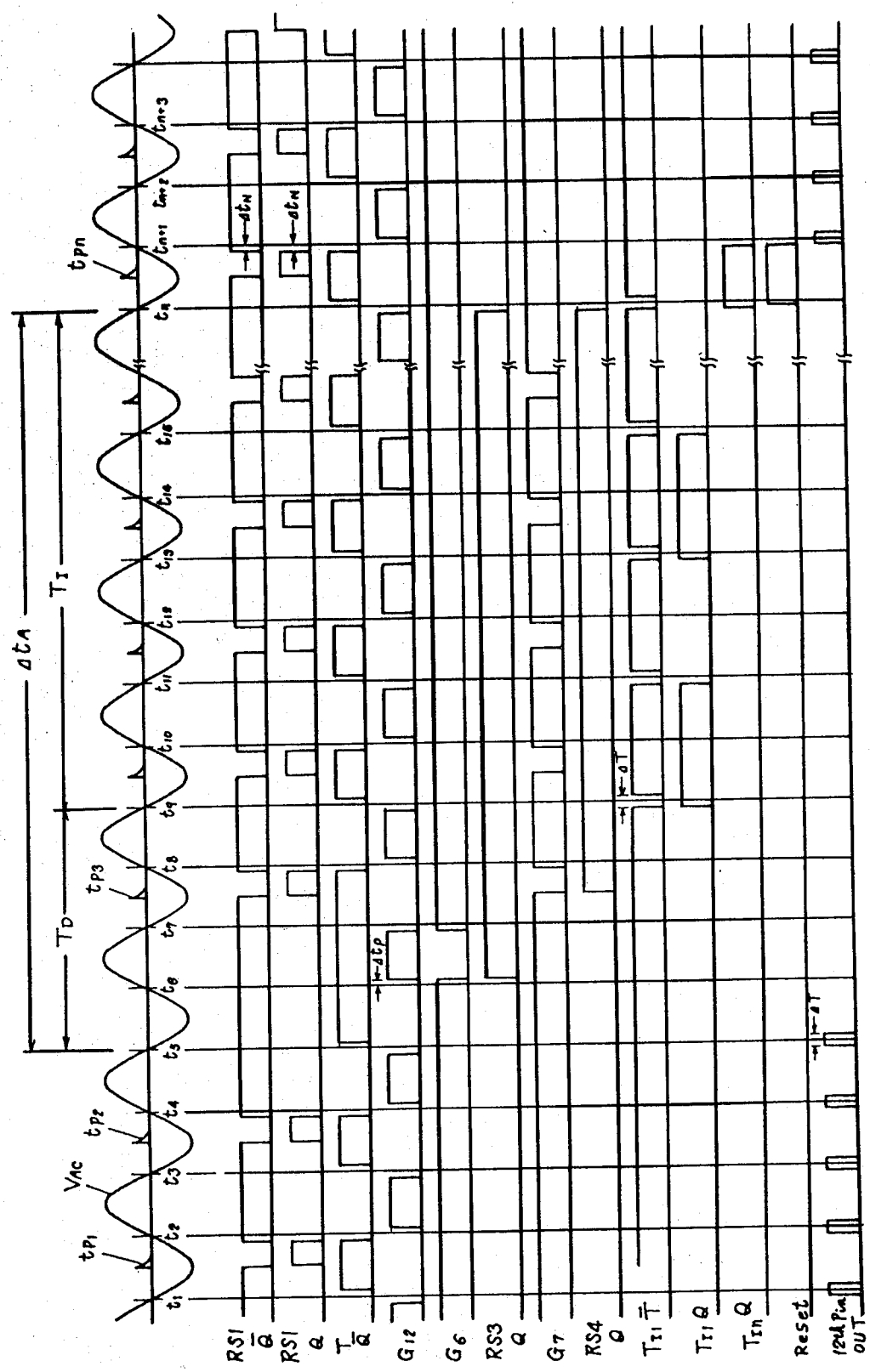
FIG. 28 is a wave form diagram showing an operation under hysteresis control.

The hysteresis control mode shown in FIG. 6 will be described. At this time, the hysteresis control selecting switch 10 is closed. With the closing of the switch 10, gate $G_{19}$ changes from "1" to "0," and gate $G_{20}$ from "0" to "1." Since gate $G_1$ is already in "1" state, gate $G_3$ changes from "0" to "1," and gate $G_{22}$ from "1" to "0." The first counter for hysteresis control is therefore brought out of its reset state. With gate $G_5$ turned from "0" to "1" at the same time, the flip-flops $RS_3$ and $RS_4$ of the hysteresis control logic unit H are also brought out of reset state. For the description of operation in hysteresis control mode, reference is made to FIGS. 9 and 28, with the time $t_1$ shown in FIG. 28 taken as a start point. During the period of $t_1$ to $t_5$, the circuits perform the operation described with reference to FIG. 27. The 12th pin gives output sufficient to trigger the thyristor 47, thus energizing the heater 48. That is, with pulses $t_p$ being generated from the neon lamp 30, the temperature of the article is in the course of rising. Upon the temperature of the article 3 reaching the set value, the lamp 30 is no longer triggered, and the pulses $t_{p2}$ which have been produced cyclically are extinguished. The reach of the temperature of the article to the setting is detected by detecting the extinction of the pulses at time $t_5$, whereupon the output from the 12th pin to the thyristor 47 is stopped to deenergize the heater 48. However since the temperature of the article 3 overshoots the set value slightly, no pulses will be produced for a period of time. The temperature thereafter starts to fall and reaches the set level $T_S$ or $T_S-\Delta T_S$ when such temperature differential $\Delta T_S$ is preset, whereupon the neon lamp 30 is triggered near time $t_8$ and generates pulses $t_{p3}$. The time $T_D$ indicated in FIG. 28 is dependent on the structure and temperature of the article 3. Although the time $T_D$ is shown to correspond to several cycles of the voltage $V_{AC}$ for illustrative purposes, this time period is actually longer. The pulses $t_{p3}$ generated again are detected and counted by the first counter I. While the first counter I is counting the pulses, the thyristor 47 is held out of conduction. The time-up output of the first counter I unlocks the gate output of the thyristor 47, with the result that the thyristor 47 is triggered again. While the hysteresis control selecting switch 10 is held closed, the above operation is repeated, whereby a temperature swing $\Delta T_D$ shown in FIG. 6 is obtained. FIG. 28 is a time chart showing the foregoing operation. With no pulses $t_p$ emitted while the voltage $V_{AC}$ is negative during time $t_5$ to $t_6$ in FIG. 28, the flip-flop $RS_1$ of the wave form shaping unit C is not set and maintains output $\overline{Q}$ of "1", so that the T-type flip-flop T is held out of operation. Since $\Delta t_p$ time after time $t_6$ gate $G_{12}$ changes from "0" to "1," the AND output of the output $\overline{Q}$ of the flip-flop $RS_1$ and the output $\overline{Q}$ of the T-type flip-flop T and the output of gate $G_{12}$ is fed to gate $G_6$ as input, resulting in the change of "1" to "0." The gate $G_6$ sets the flip-flop $RS_3$, the output Q of which changes from "0" to "1," and the gate $G_8$ changes from "1" to "0." The T-type flip-flop retains the output Q of "0." Thus gate $G_{11}$ unconditionally gives "1," deenergizing the discharge amplifier F, with no triggering output given to the thyristor 47 from the 12th pin. While the power supply voltage $V_{AC}$ is negative during the period of time $t_7$ to $t_8$, the temperature of the article 3 will fall, permitting the neon lamp 30 to generate a pulse $t_{p3}$, which sets the flip-flop $RS_1$, changing the output Q of the flip-flop $RS_1$ from "0" to "1." Since the output Q of flip-flop $RS_3$ is "1" at this time, the gate $G_7$ changes from "1" to "0." This output sets flip-flop $RS_4$, changing its output Q from "0" to "1." The output $\overline{Q}$ of the flip-flop $RS_2$ changes from "0" to "1" for a period of time $\Delta T$ at a zero cross point where the voltage $V_{AC}$ turns negative approximately at time $t_9$. Consequently the output Q of the flip-flop $RS_4$ is "1" and the output $\overline{Q}$ is "1," so that the output of the gate $G_{21}$, namely the input $\overline{T}$ to the first flip-flop $T_{I1}$ of the first counter I for the hysteresis control counter, drops to "0" for a moment, i.e. for $\Delta T$. At the edge of fall of the input $\overline{T}$ from "1" to "0," the output Q of the first counter flip flop $T_{I1}$ changes from "0" to "1." At a zero cross where the power supply voltage $V_{AC}$ turns negative at time $t_{11}$, the input $\overline{T}$ of the first flip-flop $T_{I1}$ changes from "1" to "0," consequently returning the output Q of the first flip-flop $T_{I1}$ from "1" to "0" to perform two frequency dividing operation. Since the first counter I is multi-staged as shown in FIG. 9, the above operation is repeated in succession. Immediately before time $t_n$, namely before time is up for the final nth flip-flop $T_{In}$, at the edge of fall of the input $\overline{T}$ of the first flip-flop $T_{I1}$ from "1" to "0," the output Q of the final flip-flop $T_{In}$ changes from "0" to "1." This change of output Q to "1" resets the first counter I, $T_{I1}$ to $T_{Iz}$. At the same time, the output of gate $G_5$ changes from "1" to "0," resetting the flip-flops $RS_3$ and $RS_4$ of the hysteresis control logic unit H to the initial state. Thus gate $G_8$ returns from "0" to "1," and unlocks the output Q of the T-type flip-flop T. This reset state continues until some time (period $\Delta t_N$) before time $t_{n+1}$. With the rise, i.e. from "0" to "1", of a positive zero cross pulse $\Delta T$ (when voltage $V_{AC}$ turns positive from negative) provided by the AND output of the output Q of the flip-flop $RS_2$ and the output of gate $G_{15}$, gate $G_{16}$ changes from "1" to "0," and gate $G_{23}$ from "0" to "1," thus resetting the final flip-flop $T_{In}$ of the first counter I. Consequently the output Q of the final flip-flop $T_{In}$ drops from "1" to "0," whereby the flip-flops $T_{I1}$ to $T_{Iz}$ of the first counter I are brought out of the reset state. Thus during the period of from time $t_n$ to $t_{n+1}$ while the voltage $V_{AC}$ is in negative half cycle, the flip-flops $T_{I1}$ to $T_{Iz}$ are held in reset state, thus reliably returned to the initial state. Further when the output Q of the final flip-flop $T_{In}$ drops from "1" to "0," the input of gate $G_{16}$ changes from "1" to "0," eliminating the resetting pulse of the final flip-flop $T_{In}$, hence self-resetting. The period of time $t_9$ to $t_n$ is the counting time $T_I$ for the first counter I for hystresis control. Since the temperature of the article 3 decreases during the time period $T_I$, a pulse $t_{pn}$ has already been generated during the period $t_n$ to $t_{n+1}$ following time period $T_I$. The flip-flop $RS_1$ of the wave form shaping unit C is set in response to the pulse $t_{pn}$ and resumes the normal operation. The thyristor 47 is triggered to energize the heater 48. The temperature of the article 3 is variable over the swing, namely range, $\Delta T_D$ shown in FIG. 6 by the repetition of the series of operations described. When the hysteresis control selecting switch 10 is opened, gate $G_{20}$ resets the flip-flops $RS_3$ and $RS_4$ of the hysteresis control logic unit H and the first counter I, and the system is changed over to proportional control mode.

The high setting operation and discontinuation of the operation shown in FIG. 7 will be described. The temperature setting dial 9 is turned to set the variable resistor 27 to a resistivity which will give a temperature $T_{ST}$ indicated in wavy line in FIG. 7. A knob 11 for holding high setting operation is then pulled to close the contacts 56′ and 56″ of the selecting switch. When the system is in operation with the power supply switch closed, it is assumed that the hysteresis control selecting switch 10 is open to provide proportional control mode. The gate $G_{17}$ of the high setting holding selector J is set to "0," and gate $G_{18}$ to "1." The gate $G_{17}$ brings the second counter K for holding high setting out of reset state, while the gate $G_{18}$ brings the flip-flop $RS_5$ of the memory L out of reset state. The gate $G_{17}$ also sets the input to gate $G_8$ to "0." The gate $G_8$ therefore retains output "1." Accordingly the output Q of the T-type flip-flop T is not locked, with output continuously fed to the thyristor 47 to provide proportional control mode. In other words, even when hystresis control mode is selected with the selecting switch 10 closed, the selection of the high hold mode automatically leads to proportional control mode as shown in the wave form in FIG. 7 (B). Since the first counter I is used also as part of a high hold counter except as a hysteresis control counter, the counter is started in the same manner as when it is used for hysteresis control. Stated more specifically with reference to FIG. 28, with pulses $t_p$ generated by the neon lamp 30 in succession, the set temperature (high setting) is reached, whereupon the pulses $t_p$ disappear. On detection of a pulse $t_{p3}$ subsequently emitted, the first counter I starts frequency division at time $t_9$. Thereafter, during the period of time from $t_n$ to $t_{n+1}$, time is up for the final flip-flop $T_{In}$ of the first counter I as seen in FIG. 28, such that $\Delta t_N$ time before time $t_{n+1}$, the final flip-flop $T_{In}$ is reset. With the system set for high setting operation, the gate $G_{18}$ has output of "1," so that the output Q from the final flip-flop $T_{In}$ is fed to input $\overline{T}$ of the first flip-flop $T_{K1}$ of the second counter K. As seen in FIG. 28, the output Q of the first flip-flop $T_{K1}$ of the second counter K changes from "0" to "1" at the edge of fall from "1" to "0" of the output Q of the final flip-flop $T_{In}$. This means that the output of the first counter I for hysteresis control is carried to the flip-flop $T_{K1}$. The output Q carried to the flip-flop $T_{K1}$ changes the output of the gate $G_{24}$ from "1" to "0," resetting flip-flop $RS_5$. With the output $\overline{Q}$ of the flip-flop $RS_5$ changed from "1" to "0," the setting terminal of flip-flop $RS_4$ is maintained at "0" to maintain the output Q of the flip-flop $RS_4$ at "1" so that negative zero cross pulses $\Delta T$ can be fed to the first counter I in succession. Further with the flip-flop $RS_5$ having the output $\overline{Q}$ of the "0," the input to gate $G_{16}$ as well as to the resetting terminal R of the first counter I is "0," thus preventing the feed of any resetting signal to the counter. The time taken for the completion of the above operation after time $t_5$ is $\Delta t_A$, which is the same as the counting time for hysteresis control mode. Since negative zero cross pulses $\Delta T$ are applied in succession to the input $\overline{T}$ of the first flip-flop $T_{I1}$, the counter progressively counts up even when the output Q of the last flip-flop $T_{In}$ changes from "0" to "1" without resetting (flip-flop $RS_5$ locked). On lapse of time $T_K$ shown in FIG. 7, the output Q of the final flip-flop $T_{Kn}$ of the second counter K changes from "0" to "1." Next in the positive cycle of the voltage $V_{AC}$ when gate $G_{12}$ changes from "0" to "1," the AND output of the output Q of the final flip-flop $T_{Kn}$ and the output of gate $G_{12}$ is fed to gate $G_{27}$, the output of which therefore drops from "1" to "0," actuating the amplifier M, which in turn triggers the thyristor 54 through the 10th pin. The coil 56 is energized. The thyristor 54 is triggered by the gate $G_{12}$ only in the positive half cycle. The coil energized opens the contacts 56′ and 56″ of the high setting holding switch. Consequently the temperature therefore drops to the level determined by the resistivity of the resistor 27 set by the knob 9 and adjusted to the usual level. With the opening of the contact 56″, the high setting operation selector J returns to the initial state. With gate $G_{17}$ changed to "1" and gate $G_{18}$ to "0," the gate $G_{17}$ resets the second counter K to the initial state.

Next description will be given of the operation which takes place when the contacts 56′ and 56″ of the high setting holding switch are closed, for example, at time $t_D$ in FIG. 7 during operation in hysteresis control mode with the hysteresis control selecting switch 10 closed. At this time, the first counter I for hysteresis control is in the course of counting operation. On closing the contacts 56′ and 56″, the output of gate $G_{17}$ changes from "1" to "0," bringing the second counter K out of its reset state and making it ready for receipt of input. The input to gate $G_8$ is unlocked, and the output thereof changes from "0" to "1." Gate $G_{11}$ immediately functions in accordance with the output Q of the T-type flip-flop T, causing the amplifier F to trigger the thyristor 47, which in turn energizes the heater. Thus the temperature of the article 3 to be heated starts to rise at time $t_D$. Gate $G_{18}$ brings the flip-flop $RS_5$ of the memory L out of the reset state. However, the first counter I continues to count. When time is up for the final flip-flop $T_{In}$ of the first counter I, the output is carried to the first flip-flop $T_{K1}$ of the second counter K which affords output Q of "1." The output Q of the flip-flop $T_{K1}$ sets flip-flop $RS_5$, whose output $\overline{Q}$ changes from "1" to "0." At this time, as already described with respect to the hysteresis control mode, the first counter I is entirely reset and, at the same time, the flip-flops $RS_3$ and $RS_4$ of the hysteresis control logic unit H are also reset. When the temperature of the article 3 reaches the high temperature setting, the neon lamp 30 no longer emits any pulse $t_p$. When a pulse $t_{p3}$ is emitted, the flip-flops $RS_3$ and $RS_4$ of the hysteresis control logic unit H are set through the operation already stated with reference to FIG. 28. With the setting of the flip-flop $RS_4$, the output Q of the flip-flop $RS_4$ changes from "0" to "1," with the result that a positive zero cross pulse $\Delta T$ is fed again to the input $\overline{T}$ of the first flip-flop $T_{I1}$ of the first counter I, which therefore performs a frequency dividing operation. On completion of the specified counting operation, time is up for the final flip-flop $T_{Kn}$ of the second counter K, whereupon the gates $G_{27}$ and $G_{12}$ act to function the amplifier M, which in turn triggers the thyristor 54, causing the coil 56 to open the contacts 56′ and 56″ in the same manner as already described. During the high hold period, the system is set for proportional control mode as shown in FIG. 7, giving the largest amount of heat. Thus when the contacts 56' and 56" are closed at time $t_D$ shown in FIG. 7 during hysteresis control, the effective high hold operation period is the duration $T_K$ of the operation of the second counter K, which is $\Delta t_A$ time shorter than when the switch is operated from the beginning. The resistor 66 and capacitor 67 shown in FIGS. 2 and 9 as connected in parallel with the contact 56" prevent the shake of the contact 56" when it is opened by the coil 56, thus precluding the faulty operation of the contact 56" that otherwise would result. Several cycles of power source voltage $V_{AC}$ are needed to keep the contact 56" properly open. Accordingly, without the capacitor 67, the high setting holding selector J would function the moment when the contact 56" is opened, resetting the first counter I and second counter K to resume counting state and resulting in a prolonged high hold period. The use of the capacitor 67 assures a stable operation.

Figure 29:
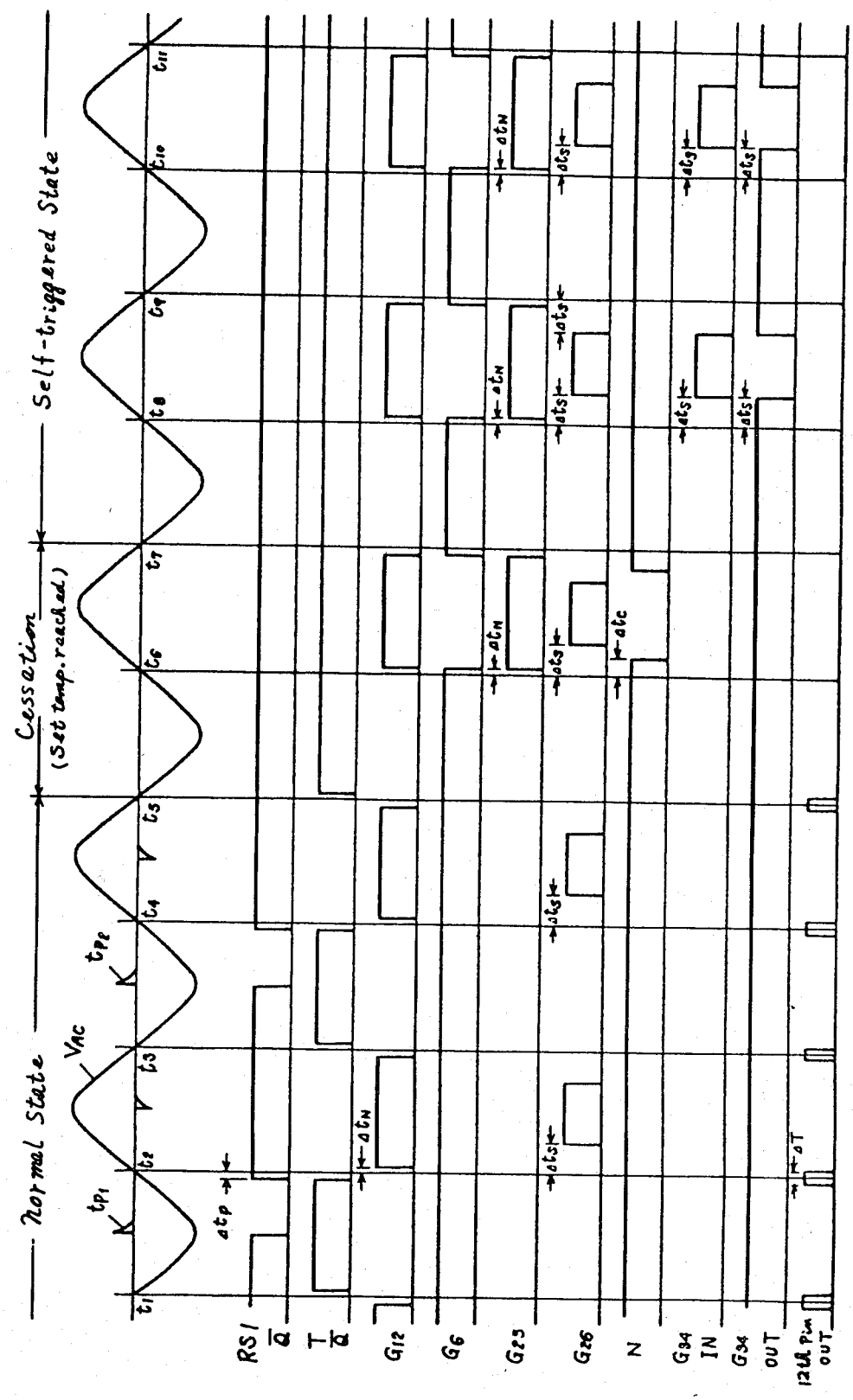
FIG. 29 is a wave form diagram showing a self-triggering detecting operation.

Diode failure of the thyristor 47 and safety operation against self-triggering thereof will be described. In this state, the thyristor 47 is in conduction irrespective of the output of the temperature sensor 7 and keeps the heater 48 energized, causing continuous rise of the temperature of the article 3 and possibly giving rise to a fire or like accident. The system must therefore be equipped with means for assuring safety against such an accident. FIG. 29 shows a time chart of safety operation in the self-triggered state. During a period from time $t_1$ to $t_5$ in FIG. 29, the system is in the normal state in which the article 3 has a low temperature, and pulses $t_p$ from the neon lamp 3 cause the 12th pin to feed output, normally triggering the thyristor 47. During the following time period $t_5$ to $t_7$, the temperature of the article 3 reaches the set value, and the thyristor 47 is in "OFF" state with no pulses $t_p$ generated. During this cessation, the input of the self-triggering amplifier P from gate $G_{34}$ is the AND output of the output of gate $G_{26}$, output of the voltage detecting unit N and output of gate $G_{25}$ and is therefore "0." The system is so designed that during the positive cycle of the voltage $V_{AC}$ from time $t_6$ to $t_7$ in FIG. 29, the gate $G_{25}$ changes from "0" to "1" with a time delay of $\Delta t_N$, the gate $G_{26}$ changes from "0" to "1" with a time delay of $\Delta t_S$, and the output of unit N changes from "1" to "0" with a time delay of $\Delta t_C$ since the thyristor 47 is in "OFF" state (see FIGS. 24 and 25). This means that the circuit of the voltage detecting unit N (for determining the time $\Delta t_C$) and the self-triggering detecting timing circuit O (for determining the time $\Delta t_S$) are so adapted that $\Delta t_C < \Delta t_S$. Accordingly gate $G_{34}$ has input "0" and output of "1." Since the amplifier P has input "1," the output thereof is "0", giving no output to the thyristor 58 (see FIG. 23). The state of the system is shown during the period $t_7$ to $t_{11}$ when failure of the thyristor 47 occurred, such as diode failure or self-triggering failure. At this time, it is assumed that the neon lamp 30 produces no pulses $t_p$, namely that the article has a temperature higher than the setting. During the period of from time $t_8$ to $t_9$ in which the voltage $V_{AC}$ is in positive cycle, the thyristor 47 comes into conduction immediately even in the absence of signal at the gate, so that the voltage detector N is in "OFF" state, giving output "1". The gate $G_{25}$ changes from "0" to "1" $\Delta t_N$ time ater time $t_8$. The gate $G_{26}$ of the detecting timing circuit 0 changes from "0" to "1" with a time delay of $\Delta t_S$. Accordingly the output of the gate $G_{34}$ to be fed to the amplifier P, which is the AND output of the output of gate $G_{26}$, output of unit N and output of gate $G_{25}$ as mentioned above, changes from "1" to "0" with a time delay of $\Delta t_S$. As a result, the output of the amplifier P changes from "0" to "1" with a time delay of $\Delta t_S$ and triggers the thyristor 58 through the 11th pin, starting to heat the resistor 59. During time period $t_9$ to $t_{10}$ in which the voltage $V_{AC}$ is in negative half cycle, the thyristor 58 is out of conduction and will not heat the resistor 59. During the period of $t_{10}$ to $t_{11}$ when the voltage $V_{AC}$ is positive, the above operation during the period $t_8$ to $t_9$ is repeated; in $\Delta t_S$ after time $t_{10}$, the thyristor 58 is brought into conduction to heat the resistor 59. The temperature of the resistor 59 rises through this operation and thermally breaks the temperature fuse 14 to stop the power supply.

Although the combination of the resistor 59 and fuse 14 is used in the system as shown in FIGS. 8, 9 and 29, also usable is breaker such as a magnetic breaker having a setting and a resetting coil.

Further safety is assured by amplifying the output from a failure detecting circuit with a power control element or transistor and passing the amplified current through a current fuse to stop the power supply to the heater.

Further when the thyristor 47 is self-triggered when the temperature of the article to be heated, 3, is lower than the temperature $T_S$ set by the knob 9, the self-triggered state is not immediately detected, and the resistor 59 is not heated. It is after the temperature of the article 3 has exceeded the temperature set by the knob 9 followed by the extinction of neon pulses that the self-triggered state is detected to energize the resistor 59. Briefly to ensure safety against the self-triggered state of the thyristor 47, the temperature sensor 7 is checked for output to compare this output with the out-of the thyristor 47 operated therewith so that the operation of the thyristor 47 taking place despite the absence of the output of the temperature sensor 7 is detected to function the safety circuit. To ensure proper safety function, the self-triggering detecting timing $\Delta t_S$ and the time $\Delta t_C$ at which the voltage detecting unit N operates while the thyristor 47 is in "OFF" state are maintained in the relation of $\Delta t_C < \Delta t_S$, whereby the thyristor 47 is checked as to whether it is normal or not after the article 3 has reached the temperature setting.

The circuit for triggering the thyristor 47 for driving the heater 48 has the following safety feature against failures, namely fail safe feature. The devices for heating the human body in contact therewith must be adapted for accurate temperature control and have high safety. Generally highly accurate multifunctional control requires a complex circuit composed of increased number of parts. Consequently the circuit becomes susceptible to the failure of parts. Thus high accuracy and versatility of function are contradictory to fail safe feature. In order to render the electric circuit of this invention operable with high accuracy for a multiplicity of functions while ensuring freedom from failure of parts, the triggering circuit for the thyristor 47 comprises an oscillating system giving "0" or "1" output or input, and the thyristor 47 is adapted to be triggered only with the charge accumulated in the capacitor 45. First, the fail safe feature of the operation for triggering the thyristor 47 will be described. During the negative half cycle of the power supply voltage $V_{AC}$ from time $t_1$ to $t_2$ in FIG. 27, the flip-flop $RS_1$ of the wave form shaping unit D is in its reset state with output Q of "0" and output $\overline{Q}$ of "1", before the neon lamp 30 emits a pulse $t_{p1}$. Since the output Q of the T-type flip-flop T is "0" and the output $\overline{Q}$ thereof is "1," the gate $G_9$ has output "0" and gate $G_{10}$, "1." The amplifier E is out of operation with no charge given to the capacitor 45. Further since the T-type flip-flop T has output Q of "0," the gate $G_{11}$ is in "1" state, holding the amplifier F also out of operation. Subsequently the neon lamp 30 emits a pulse $t_{p1}$ which sets the flip-flop $RS_1$, with the result that the output $\overline{Q}$ of the flip-flop $RS_1$ changes from "1" to "0," and the output of gate $G_{10}$ changes from "1" to "0," thus charging the capacitor 45. Since the flip-flop $RS_1$ is reset at zero cross by gate $G_{13}$, the state of the T-type flip-flop T changes; the output Q thereof changes from "0" to "1" and output $\overline{Q}$ from "1" to "0." With the gate $G_{11}$ changed from "1" to "0," the amplifier F charges the capacitor 45, and the thyristor 47 is triggered. These sequential operations will be summed up as follows:

(1) While the flip-flop $RS_1$ is out of operation (in reset state), the triggering capacitor 45 is not charged; the capacitor is charged when the flip-flop $RS_1$ is brought into operation (set state).

(2) The flip-flop $RS_1$ is brought out of operation (reset) by a zero cross pulse. The rest→set→rest of the flip-flop $RS_1$ produce changes in the output $\overline{Q}$ of the flip-flop $RS_1$ of "1"→"0"→"1." This a-c wave form (oscillating wave form) is subjected to frequency division by the T-type flip-flop T.

(3) The change of the output Q of the T-type flip-flop T discharges the energy accumulated in the capacitor 45.

With these features (1) to (3), the following results are achieved, for example, if some parts failed. If the flip-flop $RS_1$ failed while out of operation (in reset state), the output $\overline{Q}$ remains "1." Accordingly the input to gate $G_9$ remains "1," so that gate $G_{10}$ is in "1" state. The capacitor 45 will not be charged, holding the thyristor 47 out of operation. If the flip-flop $RS_1$ failed during operation (in set state), the output Q of the flip-flop $RS_1$ is "1," and the output $\overline{Q}$ thereof is "0." However, since the output $\overline{Q}$ of the flip-flop $RS_1$ does not change alternately as "1"→"0"→"1", the T-type flip-flop T, with its input T unchanged, is unable to perform frequency division and is reset, hence the output thereof Q is "0" and output $\overline{Q}$ is "1." At this time, the gate $G_9$ and $G_{10}$ function the amplifier E to charge the capacitor 45, but since the T-type flip-flop T has the output Q of "0," the gate $G_{11}$ changes to "1," leaving the amplifier F out of operation without triggering the thyristor 47. Thus in the event of failure of the flip-flop $RS_1$, no triggering output is available for thyristor 47. If the T-type flip-flop T failed and became inoperative (reset), the output Q of the T-type flip-flop T remains "0," and the output $\overline{Q}$ "1." In response to pulses $t_p$, the flip-flop $RS_1$ is alternately reversed at this time, and only when the output $\overline{Q}$ of the flip-flop $RS_1$ drops to "0," the capacitor 45 is charged via gates $G_9$ and $G_{10}$, but since the output Q of the T-type flip-flop T retains "0," gate $G_{11}$ changes to "1," leaving the amplifier F out of operation. No output is produced for triggering the thyristor 47, hence safety. If the T-type flip-flop T failed and became operative (set), the output of the T-type flip-flop T remains "1," and output $\overline{Q}$ "0." Since the output $\overline{Q}$ is "0," gates $G_9$ and $G_{10}$ keep the amplifier E operating, charging the capacitor 45 by way of the resistor 44. With the output Q of the flip-flop T in "1" state, gate $G_{11}$ holds the discharge amplifier F in operation. In this state, the current Ia flowing through the resistor 44 is not accumulated in the capacitor 45 but flows into the gate of the thyristor 47. The current Ia is given by the following equation.

$$Ia = (Vcc - V_{GK})/R_{44} + Er + Fr)$$

where Vcc is the voltage on the Zener 25 in the control circuit, $V_{GK}$ is the voltage across the gate and cathode of the thyristor 47, $R_{44}$ is the value of the resistor 44, Er is the internal resistivity of the amplifier E, and Fr is the internal resistivity of the discharge amplifier F. Generally non-triggering current $I_G$ (gate current which will not trigger in any state) is $I_{GK} = 0.2$ mA in the case of 2A type thyristor. Accordingly if the value of the resistor 44 is so determined that $Ia < I_{GK}$, the current flowing through the charging amplifier E all flows through the discharging amplifier F as a bypass even when the T-typ flip-flop T fails during operation (in set state). Safety is assured since this current Ia will not trigger the thyristor 47. The same is true of gates $G_9$, $G_{10}$, $G_{11}$, charging amplifier E and discharging amplifier F to assure safety. Next, when the hysteresis control logic unit H failed while out of operation, gate $G_8$ gives output of "1" and the system returns to proportional control mode. When the unit H failed during operation (short-circuiting), the output of the gate $G_8$ is "0," bringing the gate $G_{11}$ into the state of "1" and holding the discharging amplifier F out of operation. The thyristor 47 will not be triggered, hence safety. When the zero pulse generator B, which generates clock pulses serving as the time base of the control system, failed, there will be no signals which alternately undergo the changes of: "0"→"1"→"0" and which provide the time base. Consequently the logic gates maintain "1" or "0" and there will be no triggering pulses for the thyristor 47, hence safety.

In brief, the electric circuit of this invention comprises a series of parts which are cyclically reset, set and reset, and the capacitor is charged (no discharge during charging) and discharged (no charging during discharging) to trigger the thyristor 47, whereby fail safe is afforded in the event of failure of the parts.

Safety is maintained in the following manner when the thyristor 47 completely failed by short-circuiting. As shown in FIGS. 2 and 8, the thyristor operates over the entire wave of the power supply voltage $V_{AC}$. In the event of a failure, the diode 61 energizes the resistor 62 to heat the same during the negative half cycle of the voltage $V_{AC}$. The temperature of the resistor 62 rises to thermally break the fuse 14 and stop the power supply.

Further safety is assured by amplifying the output from a failure detecting circuit with a power control element or transistor and passing the amplified current through a current fuse to stop the power supply to the heater.

Even while the electric circuit shown in FIG. 2 is in normal operation, local overheating of the heater 6 can take place. In such an event, safety is ensured in the following manner. FIG. 4 shows the construction of the heater 6, in which meltable resin 50 is interposed between the heater wire 48 and safety wire 49. Temperature will locally build up for one cause or another, for example, when the heater is locally prevented from heat dissipation. With continued operation, the temperature further rises, eventually melting the resin 50 to bring the safety wire 49 into contact with the heater wire 48. As a result, great current flows through the circuit of: point A—heater wire 48—contact portion—safety wire 49—resistor 55—point B shown in FIG. 2, causing the resistor 55 to generate heat, which thermally cuts the temperature fuse 14 to stop the power supply for safety.

Alternatively the safety circuit may be so adapted that short-circuit current resulting from the short-circuiting of the heater with a conductor is passed through a current fuse to stop the power supply to the heat generating load.

Indicated at $G_{28}$ in FIGS. 8 and 9 is a testing element for checking the control unit 41 for proper function especially when it is made into an IC on one chip. The IC can be tested as by checking hFe and ICBO between the 6th and 7th pin. If the properties between these pins are found to be in the specified ranges, the circuit will operate properly.

The lamp 13 in FIG. 2 is turned on only while the thyristor 47 is in conduction, indicating the energization of the heater 48.

Figure 30:
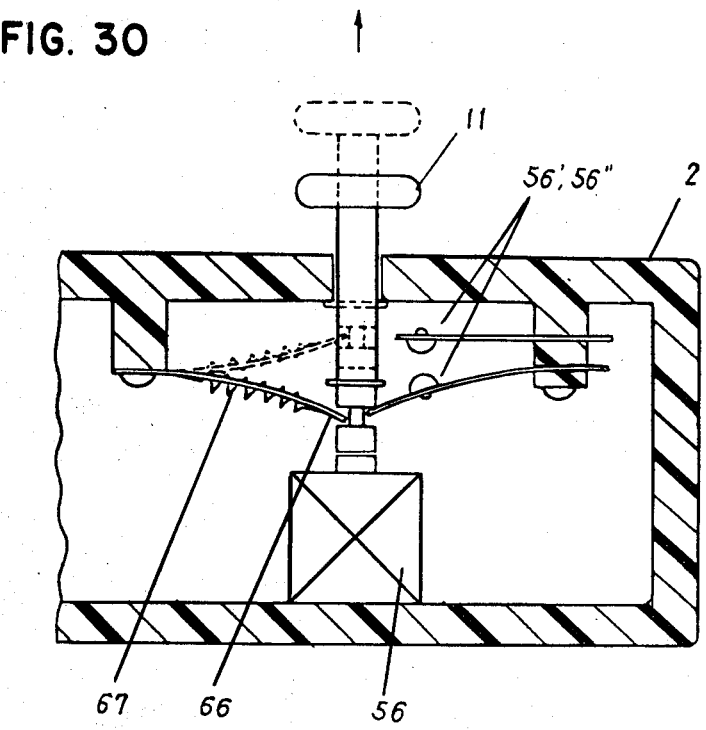
FIG. 30 is a sectional view showing a switch unit for holding a high setting operation and discontinuing the operation.

FIG. 30 shows the arrangement of coil 56 for discontinuing high setting operation and contacts 56' and 56" therefor. When the knob 11 is depressed to the solid-line position in FIG. 30, a leaf spring 66 is bent downward and is retained in a lower limit position by a coil spring 67. In this position, the contacts 56' and 56" are open. When the knob 11 is pulled up to the broken-line position, the leaf spring 66 is bent upward and retained in its upper limit position. The knob 11, even if released from an upward pull, remains in its raised position. At this time, the contacts 56' and 56" are closed. When the thyristor 54 shown in FIG. 2 is triggered, the coil 56 is energized, pulling the knob 11 downward and retains the knob 11 in the lower limit position of the leaf spring 66 and coil spring 67. The contacts 56' and 56" are open in this position. If the knob 11 in its raised position is depressed by an external force, namely by the hand, the knob 11 is lowered to the lower limit position and retained therein. Thus the high setting operation is manually discontinued.

Figure 31:
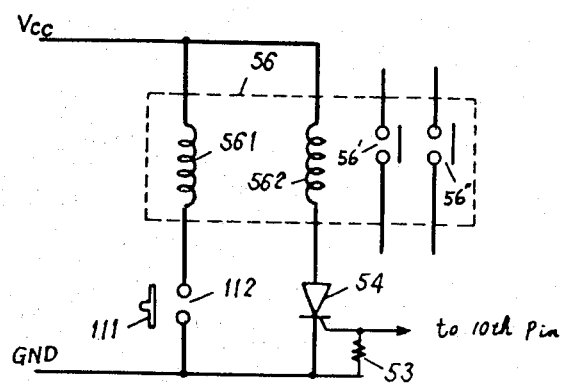
FIG. 31 is a diagram showing a circuit for holding the high setting operation and discontinuing the operation.

FIG. 31 shows another embodiment for holding the high setting and discontinuing high setting operation. In FIG. 31, the coil 56 is replaced by a relay having a setting coil 561 and a resetting coil 562, and the knob 11 is replaced by a push-on type knob 111 in combination with a normally open contact 112. When setting the system for high setting operation, the knob 111 is pushed, energizing the setting coil 561 by way of the contact 112, whereby the contacts 56' and 56" are closed to bring the system into high setting operation. The system is brought out of the high setting operation by triggering the thyristor 54 via 10th pin to energize the resetting coil 562, which opens the contacts 56' and 56".

Figure 32:
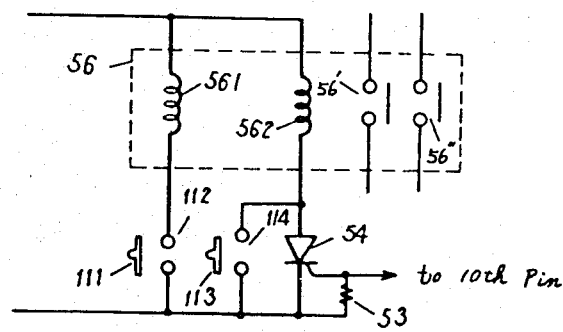
FIG. 32 is a diagram showing another circuit for holding the high setting operation and discontinuing the operation.

FIG. 32 shows a modification of the circuit shown in FIG. 31. The modified circuit further includes a push-on knob 113 for manual resetting in combination with a normally open contact 114. The resetting coil 562 can be energized from outside by way of the contact 114 for manual resetting.

Figure 33:
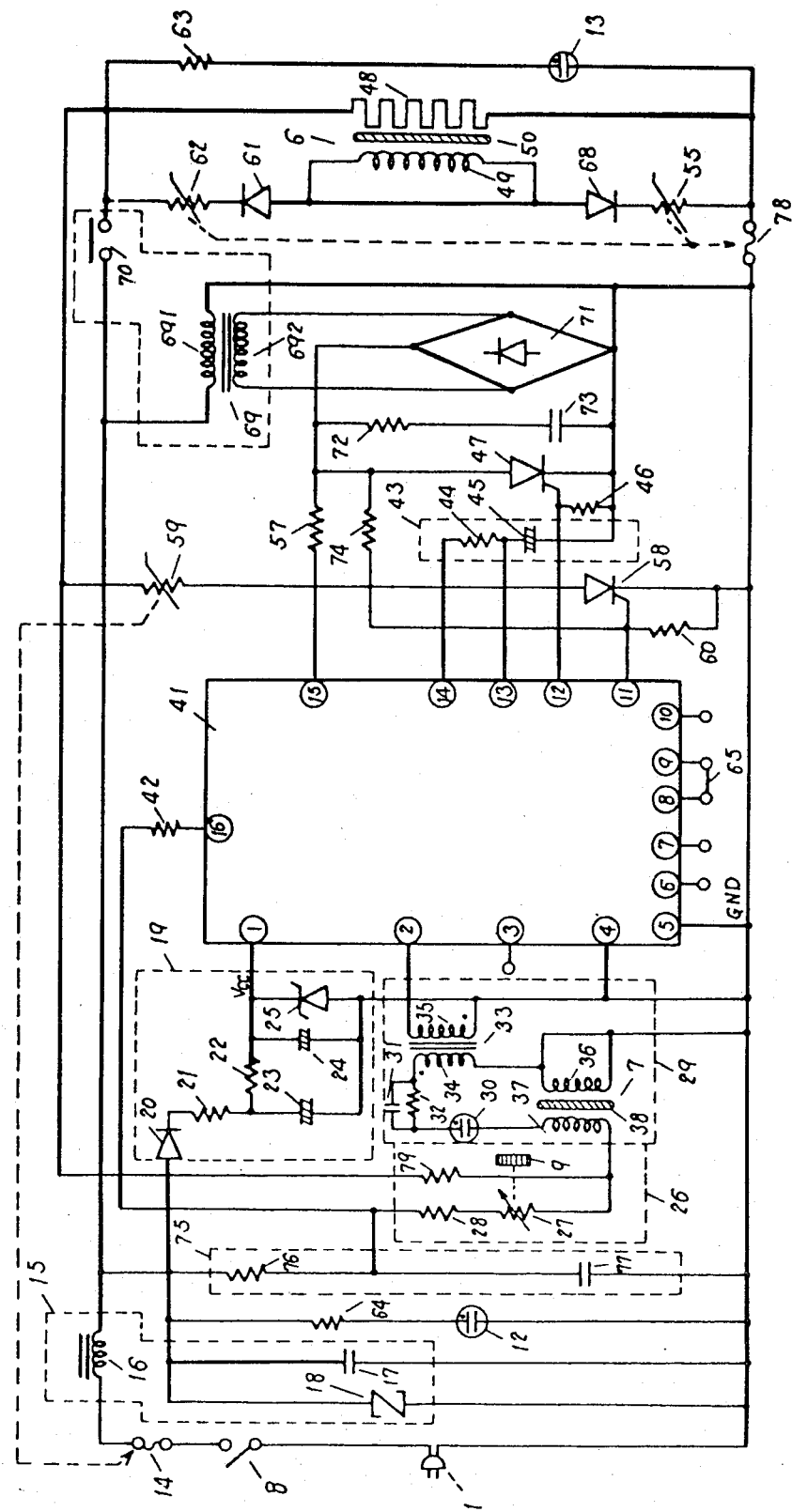
FIG. 33 is an overall diagram showing another embodiment in which the current through the heater is controlled by a relay.

FIG. 33 shows an electric circuit in which the load is an induction-type relay. The parts which perform the same function as those in the circuit of FIG. 2 are indiated by the same numerals. In FIG. 33, the thyristor 47 energizes a transfer relay 69 having two windings 691 and 692 to control the energization of the heater 6 with its normally open contact 70. The voltage on the secondary winding of the transfer relay 69 is subjected to full-wave rectification with a full-wave diode bridge 71. When the thyristor 47 is triggered, a short-circuit current flows through the secondary winding, with increased current flowing through the primary winding 691 to close the contact 70.

Figure 34A:
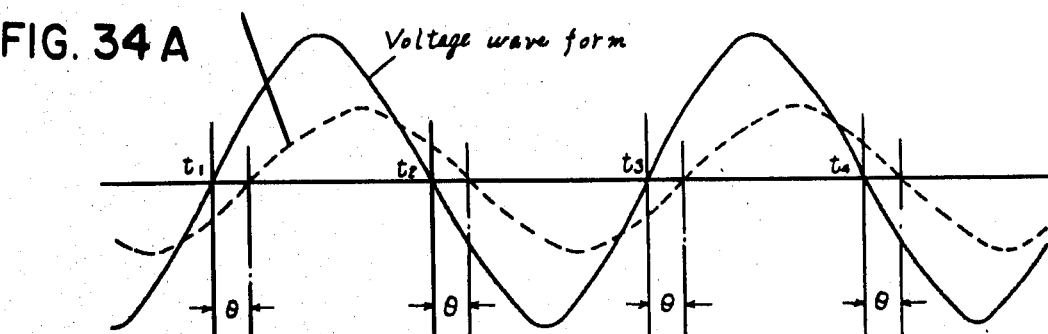
FIGS. 34a to 34d are wave form diagramming the operation of the same.
Figure 34B:
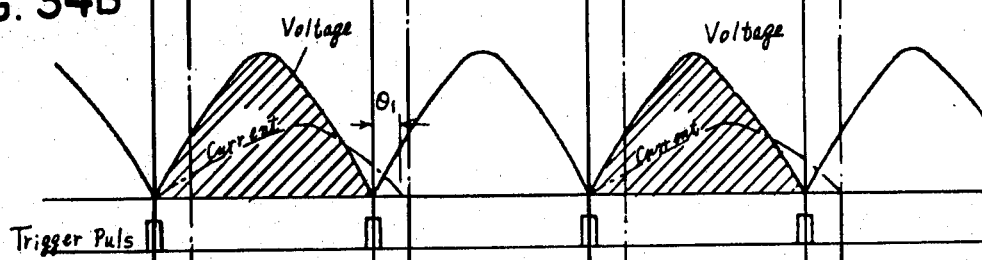
Figure 34C:
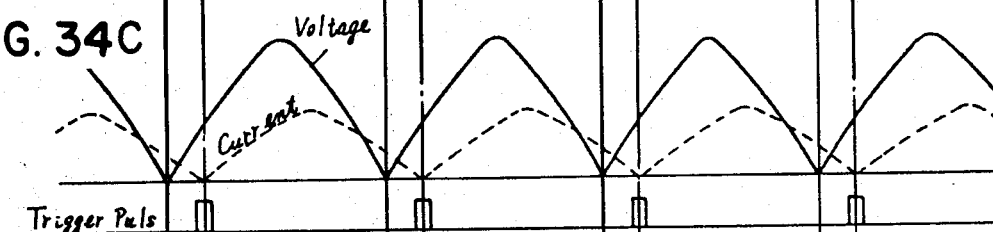
Figure 34D:
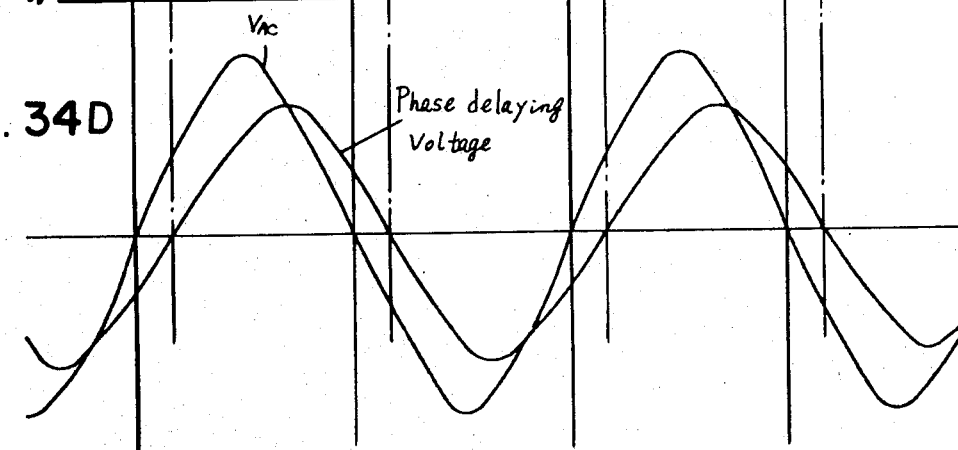

FIGS. 34a to 34d show the voltage and current waves involved in the circuit of FIG. 33. FIG. 34a shows that the current through the secondary winding 692 is delayed by an angle $\theta$ with respect to the voltage wave. The angle $\theta$ is a delay angle (extinction angle of the thyristor) determined by R/L where R is the resistivity of the remote control relay serving as load, and L is the inductance thereof. FIG. 34b shows a case in which the triggering pulse (output from 12th pin) for the thyristor 47 is generated at a point when the voltage wave crosses the zero level. At this time, the extinction angle (point where current falls to zero) of the thyristor 47 is $\theta_1$ and extends into the next cycle. In other words, when a trigger pulse is given at time $t_1$, current flows over the period of $t_2 + \theta_1$. Further even if a trigger pulse is given at time $t_2$, the pulse disappears before $\theta_1$, so that the thyristor 47 is held out of conduction during the period of time $t_2$ to $t_3$. Thus even when trigger pulses for the thyristor 47 are given cyclically at points where the voltage crosses the zero level, the thyristor 47 is brought into half-wave conduction every cycle as indicated by hatching. Consequently the contact 70 of the transfer relay 69 will be vibrated or shaken, failing to function properly. To overcome this defect, the generation of the trigger pulse for the thyristor 47 is forcibly delayed by $\theta$, which is dependent on the load, when triggering the thyristor as illustrated in FIG. 34c, in which case the thyristor can be reliably triggered over the full wave, permitting smooth operation of the transfer relay 69. FIG. 34d shows a case in which the input voltage on the 16th pin is delayed as by a capacitor in FIG. 33 for the energization of the control circuit 41 so as to delay the trigger pulse by the angle $\theta$. FIG. 33 shows a phase delay unit 75 comprising a resistor 76 and a capacitor 77 for performing this function. The 16th pin is connected to the phase delay unit 75 by way of the resistor 42.

With the control circuit 41 included in the circuit of this invention, the temperature is detected during half cycle of the voltage $V_{AC}$, and the pulse $t_p$ generated during the half cycle provides a 2-bit thyristor triggering pulse as already stated, so that the thyristor 47 is invariably triggered over full wave and will not be half-wave triggered. If the temperature is detected during positive half cycle with the thyristor triggered during negative half cycle only, and the temperature is then detected during the following negative half cycle to trigger the thyristor in positive half cycle only, the following problem is likely to develop. Whereas there will be no problem if the discharge voltage $V_{BOP}$ of the neon lamp 30 of the detecting unit 29 during positive half cycle is equal to the discharge voltage thereof $V_{BON}$ during negative half cycle, there is a range in which the neon lamp 30 breaks down only during negative or positive half cycle of the voltage $V_{AC}$ when the temperature of the article 3 is close to the set level and if $V_{BOP}$ is not equal to $V_{BON}$. In such a case, the thyristor 47 is triggered only when the voltage $V_{AC}$ is in positive or negative cycle, so that when the load is a relay, the relay will be vibrated, giving rise to thermal adhesion of the the relay contact. Further in the case where the load is an induction motor, the motor will not rotate since only half-wave current flows, while the direct current portion is likely to thermally damage the motor. In the case of the control circuit 41 of this invention, however, 2-bit trigger pulses are generated to trigger the thyristor invariably over the full wave, thus assuring the flow of alternating current. The circuit is therefore suited to induction-type load.

The temperature setting unit 26 shown in FIG. 33 includes a resistor 79 which is used to permit hysteresis of temperature during operation under hysteresis control. As already described with reference to FIGS. 2, 9 and 28, the first counter I for hysteresis control starts a counting operation when a pulse $t_p$ is generated again after disappearance of successively produced pulses $t_p$ upon the temperature of article 3 reaching the set value as shown in FIG. 28, in which this period is indicated by $T_D$. The resistor 79 in FIG. 33 determines this period $T_D$ and permits generation of a pulse $t_p$ when the temperature of the article 3 has decreased by ΔtOFF from the set OFF temperature TOFF, thus giving a temperature differential. Stated more specifically, while the article 3 is heated by the heater 48, the transfer relay 69 has its contact closed. This brings the resistor 79 into parallel connection with the resistor 28 and variable resistor 27. The parallel resistivity $R_Y$ is given by $$R_y = \frac{(R_{28} + R_{27}) \times R_{79}}{R_{28} + R_{27} + R_{79}}$$

in which $R_{76}$ is neglected. When the temperature TOFF determined by $R_Y$ (smaller than $R_{27}$ plus $R_{28}$) is reached, the thyristor 47 is brought out of conduction, the transfer relay 69 deenergized and the heater 48 deenergized. At this time, the resistor 79, on the same side as the resistor 27, is connected (by way of the heater 48) to the layer impedance $Z_7$ of the windings 36 and 37 of the sensor 7. Subsequently when the temperature of the article 3 drops by ΔtOFF, the impedance $Z_7$ increases to discharge the neon lamp 30, which generates a pulse $t_p$. When the value of the resistor 79 decreases, ΔtOFF increases, and if it is increased, ΔtOFF decreases. With the arrangement of FIG. 33, therefore, the OFF period $\Delta t_A$ of the thyristor 47 in hysteresis control mode is the sum of the period $T_D$ dependent on the temperature differential and time $T_1$ determined by the counting time of the first counter I for hysteresis control. This system has the following features. (1) When the article 3 has good heat retaining properties, reduced heat dissipation permits the temperature of the article to decrease gently. The period $\Delta t_A$ in FIG. 6 is determined substantially by the temperature differential ΔtOFF. Thus the time $T_D$ for ΔtOFF >> the time $T_I$ for the first counter K. (2) When the article 3 permits good heat dissipation, the temperature of the article 3 drops rapidly, with the result that $\Delta t_A$ in FIG. 6 is determined substantially by the time of the first counter I. Thus the time $T_D$ for ΔtOFF << the time $T_I$ for the first counter I. Especially when the heater 48 is adapted to be turned on and off by a relay or like device having a contact, the system renders the contact serviceable for a prolonged period, hence improved life, because the device is held out of operation during the period of $T_I$. Furthermore power supply can be effected with troubles reduced due to frequent turning on or off.

When the resistor 79 in FIG. 33 is made ad table, the temperature swing $\Delta T_D$ is determinable in accordance with the environment in which the article is used or as desired by the user. Although not shown, the temperature swing $\Delta T_D$ is rendered variable when the number of the flip-flops used for the first counter I shown in FIG. 9 is selectively variable.

The same advantages as described above can be obtained also by another embodiment to be described below. With this embodiment, the number of pulses $t_p$ produced by the neon lamp 30 is counted up by the first counter I. When the temperature sensed by the sensor 7 is low, the layer impedance $Z_7$ is great, so that the neon lamp 30 is triggered at an early phase of the voltage $V_{AC}$, generating several pulses $t_p$ in a half cycle of the voltage $V_{AC}$. When the temperature rises and approaches the set level, only one pulse $t_p$ will be emitted at a late phase of half cycle of the voltage $V_{AC}$. The pulse $t_p$ is counted up by the counter, and during counting, the heater 48 is held unenergized to achieve the same effect as above.

The hysteresis control methods described above are temperature dependent in that the period in which the heater 48 is held out of operation is varied in accordance with the fall of the temperature of the article 3 from the set temperature TOFF, namely with heat dissipation.

According to another embodiment described below, the off-period of the heater 48 is determined only with time. The flip-flop $RS_4$ is eliminated from the hysteresis control logic unit H of FIG. 9, and the input of gate $G_{21}$ to be coupled to the output Q of the flip-flop $RS_4$ is coupled to the output Q of the flip-flop $RS_3$. This no longer involves the time $T_D$, making it possible to operate the first counter I on extinction of the pulse $t_p$. Unlike the conventional temperature control systems in which temperature differential is used, the heater 48 can be invariably held out of operation for a period of time set by the timer $T_I$, thus eliminating troubles such as power supply trouble due to frequent on-off action and vibration of relay 60 which will occur in the case of low household power capacity. Stated more specifically with reference to FIG. 33, when the temperature differential ΔtOFF is to be obtained only with use of the resistor 79, the power supply voltage $V_{AC}$ drops when the heater 48 is energized on energization of the transfer relay 69 with an increased value given to the resistor 79, with the result that the voltage drop turns off the neon lamp 30 which has been lighted. The thyristor 47 is therefore brought out of conduction, deenergizing the relay 69 to deenergize the heater 48, whereupon the voltage $V_{AC}$ returns to the original level. This turns on the neon lamp 30 again and energizes the relay via the thyristor 47. In this way, the relay 69 is liable to chatter. This becomes inevitable when the heater 48 has a large power capacity. To avoid the trouble, there is the necessity of using a resistor $R_{79}$ of substantially low value to provide an exceedingly large temperature differential ΔtOFF. The circuit of this invention has the feature that the above defect can be overcome by a simple first timer I which holds the heater 48 out of operation.

The circuit of FIG. 33 operates in the following manner to ensure safety when parts failed. When the contact 70 of the transfer relay 69 is thermally adhered, the heater 6 will be held energized, hence hazardous. When the temperature of the article 3 has reached the set level in this state, the neon lamp 30 stops generation of pulses $t_p$. Consequently no trigger pulses are fed to the thyristor 47 from the 12th pin. The thyristor 47 is brought to "OFF" state, permitting the resistor 74 to trigger the thyristor 58 and causing the resistor 59 to generate heat. The temperature of the resistor 59 thereafter builds up, with the result that the temperature fuse 14 is thermally broken to stop the power supply and assure safety. Further when the thyristor 47 is short-circuited, the transfer relay 69 continues to operate and keeps the heater 6 energized through the contact 70, hence hazardous. In such an event, the voltage of the thyristor 47 is detected by way of the resistor 57, and the self-triggering circuit of the control unit 41 functions, giving a trigger pulse to the thyristor 58 via the 11th pin. The thyristor 58 is brought into conduction, causing the resistor 59 to generate heat, which thermally breaks the fuse 14 to stop the power supply and ensure safety. Further when the heater 6 becomes locally overheated, the heater wire 48 comes into contact with the safety wire 49 to pass current through the resistors 55 and 62 by means of diodes 61 and 68 on the same principle as already stated with reference to FIG. 2. As a result, the resistor 55 or 62 generates heat, which thermally breaks the fuse 78 to deenergize the heater 6 for safety.

Figure 35:
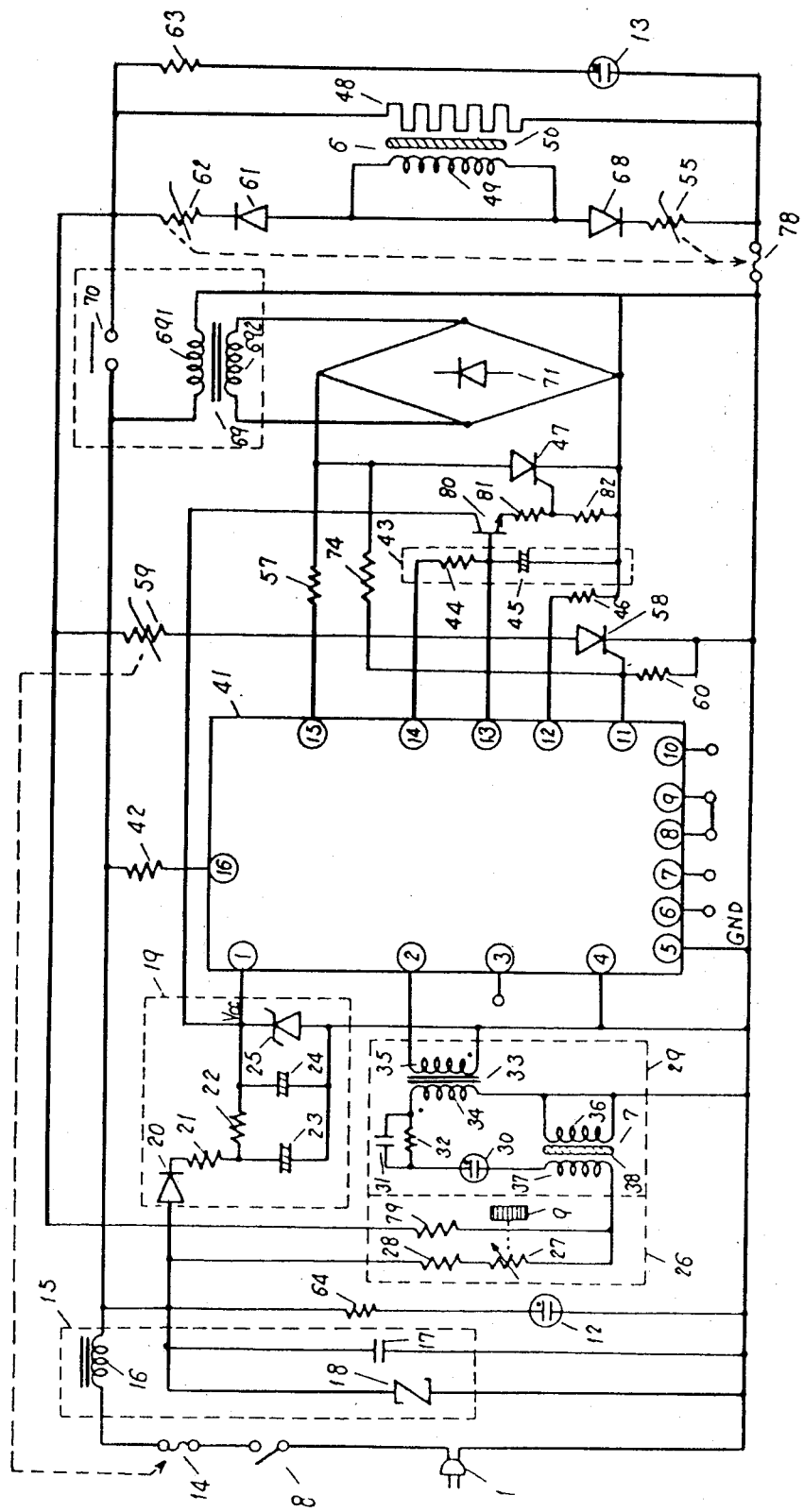
FIG. 35 is an overall diagram showing another embodiment in which the current through the heater is controlled by a relay.
Figure 36:
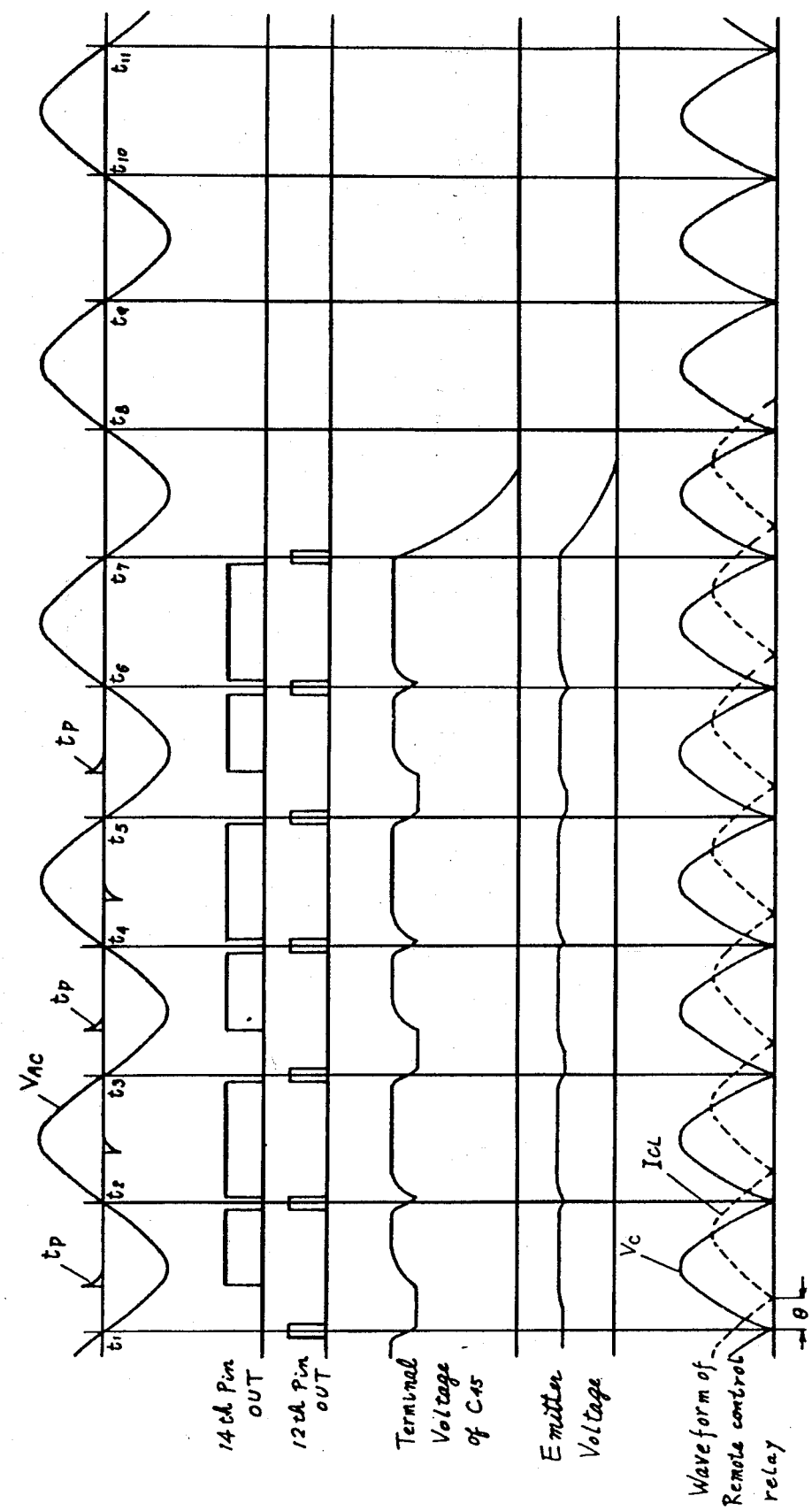
FIG. 36 is a wave form diagram showing the operation of the same.

Another embodiment will be described below in which the load is of induction type. FIG. 35 shows the circuit thereof. The parts which perform the same function as those shown in FIG. 33 are indicated at the same reference numerals. The circuit of FIG. 35 differs from that of FIG. 33 in that are thyristor 47 is triggered with direct current with use of a transistor 80. FIG. 36 shows wave forms involved in the operation of the circuit shown in FIG. 35. With reference to FIG. 36, the circuit operates in the following manner. When a pulse $t_p$ is produced during negative cycle of the power supply voltage $V_{AC}$, the output from the 14th pin of the control unit 41 and the output from the 12th pin thereof have the wave forms shown in FIG. 36 as already stated. While the 12th pin affords trigger pulses for the thyristor 47 in the circuits of FIGS. 2 and 33, the 12th pin in the circuit of FIG. 35 does not provide trigger pulses. The terminal voltage across the capacitor 45 for charging or discharging the capacitor is detected by the transistor 80 of the emitter-follower type (see FIG. 36, terminal voltage $C_{45}$). At the voltage across resistors 81 and 82 while "terminal voltage $C_{45}$" of FIG. 36 is produced, the thyristor 47 is triggered with direct current. As a result, the operation of the transfer relay 69 involves the wave form shown in FIG. 36, so that a reliable operation results irrespective of the R/L value of the relay 69. When the rise of the temperature of the article leads to the extinction of the neon pulse $t_p$, the terminal voltage $C_{45}$ of the capacitor 45 drops as seen in FIG. 36, whereby the thyristor 47 is brought out of conduction at time $t_8$ in FIG. 36 to deenergize the transfer relay 69.

The circuit of FIG. 35 incorporates a fail safe feature such that the terminal voltage of the capacitor 45 is produced only when all the parts function normally as already detailed. The voltage is amplified by an amplifier of the emitter-follower type including the transistor 80 to trigger the thyristor 47 with direct current. Thus the circuit reliably operates even under induction-type load while maintaining the fail safe feature. With respect to other features, the circuit operates exactly in the same manner as that of FIG. 33.

Figure 37:
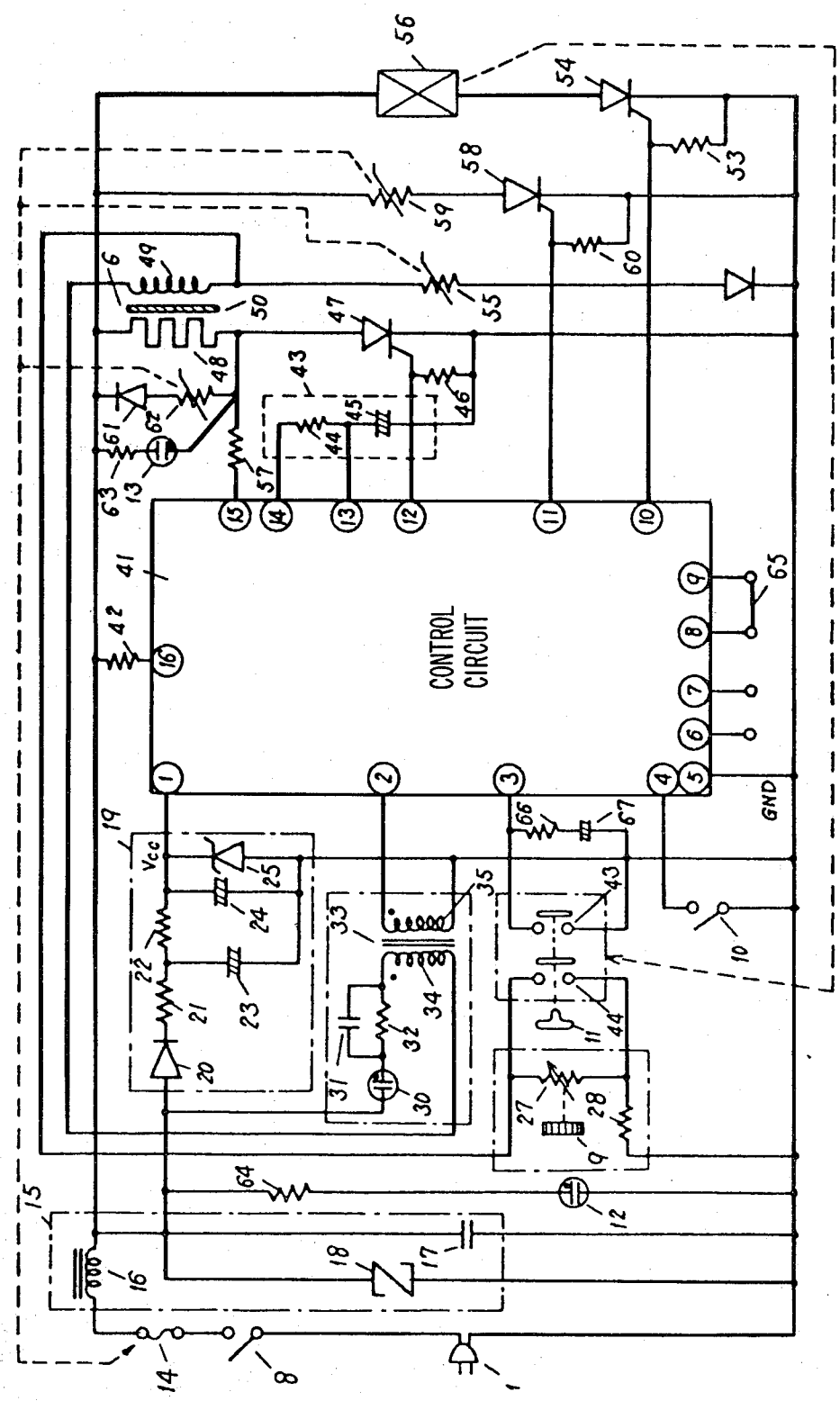
FIG. 37 is an overall circuit diagram showing an embodiment including a heater and a temperature sensor which are assembled as a wire.

FIG. 37 shows a circuit which incorporates a heater 6 and a temperature sensor 7 which are assembled in the form of a wire, whereas the circuits shown in FIG. 2, 33 and 35 use the sensor 7 and heater 6 which are separately arranged as two wires. The member 50 provided between a heater wire 48 and a safety wire 49 is composed of a temperature sensitive organic semiconductor having the characteristics of FIG. 5. The circuit of FIG. 37 operates exactly in the same manner as the circuit of the two-wire type shown as in FIG. 2. During the negative cycle of the power supply voltage $V_{AC}$, the layer voltage across the heater wire and the safety wire 49 is utilized for the detection of temperature by the neon lamp 30, and the resulting pulse $t_p$ is used for the control of temperature. The single-wire circuit of FIG. 37 has the feature that it is simpler in construction than the two-wire circuit.

Although the embodiments described above incorporates a thyristor as a power control element, this invention is not limited to the use of thyristor alone, and the thyristor is of course replaceable by a bidirectional semiconductor control element, relay or the like as desired.

The system of this invention having the foregoing construction has the following advantages.

(1) The combination of various electric circuits adapted for proportional control, hysteresis control, high setting operation, etc. and comprising semiconductors renders the electronic temperature control system operable with high accuracy and high reliability.

(2) The hysteresis function afforded to render the temperature of the blanket or like article to be heated swingable over a predetermined range gives stimulating and comfortable warmth to the human body unlike conventional like systems.

(3) Aside from the usual temperature setting, the system is manually or automatically settable at a high temperature to operate at the high level for a specified period of time and is thereafter brought out of the high setting operation into operation at the usual setting. This makes the system usable with ease and ensures savings in energy and improved safety.

(4) The system effects hysteresis temperature control or usual proportional temperature control selectively as desired by the user and is also adapted for sustained operation at the high setting for a specified period of time to meet the various needs of the user.

(5) The system incorporates a hysteresis control circuit by which, after the temperature of the article has reached the set level, the power supply to the heater or like heat generating load is stopped, thereafter allowing the temperature of the article to fall by a predetermined differential range, and the power supply to the heat generating load is resumed upon the lapse of time set by the timer. The circuit has the following advantages. When the article has good heat retaining properties, the temperature of the article is swingable substantially over the differential range, whereas if the article has low heat retaining properties, the temperature swings over a range determined by the timer. Under any conditions, therefore, the system does not involve frequent switching action of the power control element which would adversely affect the life of contacts and lead to power supply troubles and other problems. The circuit further provides an appropriate temperature swing.

(6) The temperature swing is variable by altering the differential temperature range for the article or the time set by the timer. This enables the system to meet varying needs.

(7) The timer is a counter circuit by which time is settable with higher accuracy than a CR timer system.

(8) When the switch for setting the system to the high temperature is made automatically operable as by detecting the atmospheric temperature (room temperature), the system can be maintained in high setting operation in low-temperature environment.

(9) The system, when set for the high setting operation, can be manually brought out therefrom during the operation. Thus the system is adapted for various uses.

(10) The time to be set by the timer is easily variable by feeding, to the input terminal of a counter for counting the reference frequency of the IC control circuit, output from an oscillator circuit having a different frequency.

(11) The system incorporates a high setting holding circuit provided with a knob, which sets the system for the high temperature operation when pulled and brings the system therefrom when pressed on. The circuit holds the system in the high setting operation for a specified period of time when the knob is pulled. Thus the high setting operation can be invariably discontinued when the knob is pushed inadvertently during sleeping. This leads to exceedingly higher safety than when the knob is adapted to effect the high setting operation upon depression.

(12) When the output for discontinuing the high setting operation energizes a coil to open the control contact of the coil, the material and shape of the contact can be selected as desired in accordance with the load on the contact.

What is claimed is:

1. A temperature control system comprising a heat generating load for an article to be heated, a power control element for controlling power supply to the heat generating load, a temperature detecting circuit for producing an ON signal when the temperature detected by a temperature sensor for receiving the heat of the heat generating load is lower than a temperature set by a temperature setting unit and for producing an OFF signal when the detected temperature has reached the set temperature, and a control circuit for feeding an ON or OFF signal to the power control element in response to said ON or OFF signal from the temperature detecting circuit, the control circuit having a hysteresis control circuit which actuates a timer when the signal from the temperature detecting circuit has changed from an ON signal to an OFF signal or from an OFF signal to an ON signal to permit the power control element to receive OFF signals while the timer is in operation despite ON signals emitted from the temperature detecting circuit and to receive an ON signal in response to an ON signal from the temperature detecting circuit after lapse of the time set by the timer until the temperature detected by said temperature sensor has reached the set temperature, whereby to render the temperature of the article to be heated swingable over a predetermined range in repetitive cycles.

2. A temperature control system as defined in claim 1 wherein the hysteresis control circuit comprises, as said timer, a counter circuit which is energized when the signal from the temperature detecting circuit has changed from an ON signal to an OFF signal or from an OFF signal to an ON signal to permit the power control element to receive OFF signals while the counter circuit is in counting operation even after the temperature has lowered to a level at which the signal from the temperature detecting circuit changes to an ON signal and to receive an ON signal in response to an ON signal from the temperature detecting circuit after the completion of the operation of the counter circuit.

3. A temperature control system as defined in claim 1 or 2 which has hysteresis adjusting means for adjusting the temperature swing of hysteresis control.

4. A temperature control circuit comprising a heat generating load for an article to be heated, a power control element for controlling power supply to the heat generating load, a temperature detecting circuit for producing an ON signal when the temperature detected by a temperature sensor for receiving the heat of the heat generating load is lower than a temperature set by a temperature setting unit and for producing an OFF signal when the detected temperature has reached the set temperature, and a control circuit for feeding an ON or OFF signal to the power control element in response to said ON or OFF signal from the temperature detecting circuit, the control circuit having a switch for selecting proportional control or hysteresis control alternatively, a proportional control circuit for feeding an ON or OFF signal to the power control element exactly in response to the ON or OFF signal from the temperature detecting circuit while the switch is set for proportional control, a hysteresis control circuit operable while the switch is set for hysteresis control to actuate a timer when the signal from the temperature detecting circuit has changed from an ON signal to an OFF signal or from an OFF signal to an ON signal, permitting the power control element to receive OFF signals while the timer is in operation despite ON signals emitted from the temperature detecting circuit, the hysteresis control circuit further permitting the power control element to receive an ON signal from the temperature detecting circuit after lapse of the time set by the timer until the temperature detected by said temperature sensor has reached the set temperature, whereby to render the temperature of the article to be heated swingable over a predetermined range in repetitive cycles, another switch for setting the temperature setting unit to a high temperature level and resetting the unit to the initial set temperature, and a high setting holding circuit for starting a timer when the second-mentioned switch is set to the high level to hold the same switch set to the high level during the operation of the second-mentioned timer and resetting the second-mentioned switch upon lapse of the time set by the same timer to discontinue the high setting operation.

5. A temperature control system as defined in claim 4 wherein the second-mentioned switch is automatically operable by detecting atmospheric temperature.

6. A temperature control system as defined in claim 4 wherein the second-mentioned switch is settable to the high level by pulling a knob and resettable by pushing the knob.

7. A temperature control system as defined in claim 4 wherein the switch is settable to the high level with its contacts clsoed by pulling a knob and resettable with its contacts opened by pushing the knob, the contacts being openable for resetting by a coil which is energized with discontinuing output produced upon lapse of the time set by the timer of the high setting holding circuit.

8. A temperature control system as defined in claim 4 which has a circuit for discontinuing the high setting operation during the operation of the timer when the switch is manually reset while the high setting holding circuit is in operation.

9. A temperature control system as defined in claim 4 wherein the hysteresis control timer is used also as the timer for determining the duration of the high setting operation.

* * * * *